United States Patent
Roundtree

(10) Patent No.: US 10,540,515 B2
(45) Date of Patent: Jan. 21, 2020

(54) CONSUMER AND BRAND OWNER DATA MANAGEMENT TOOLS AND CONSUMER PRIVACY TOOLS

(71) Applicant: AutoGraph, Inc., Seattle, WA (US)

(72) Inventor: Brian Roundtree, Seattle, WA (US)

(73) Assignee: AutoGraph, Inc., Seattle, WA (US)

( * ) Notice: Subject to any disclaimer, the term of this patent is extended or adjusted under 35 U.S.C. 154(b) by 389 days.

(21) Appl. No.: 15/171,997

(22) Filed: Jun. 2, 2016

(65) Prior Publication Data

US 2016/0283740 A1 Sep. 29, 2016

Related U.S. Application Data

(63) Continuation-in-part of application No. 14/078,515, filed on Nov. 12, 2013, now abandoned.

(60) Provisional application No. 61/724,863, filed on Nov. 9, 2012.

(51) Int. Cl.
*G06F 21/62* (2013.01)
*H04L 29/08* (2006.01)

(52) U.S. Cl.
CPC ........ *G06F 21/6245* (2013.01); *H04L 67/306* (2013.01)

(58) Field of Classification Search
CPC ... G06F 21/6245; H04L 63/104; H04L 67/20; H04L 51/14; H04L 67/306; H04L 63/08; H04L 51/28; G06Q 30/00
See application file for complete search history.

(56) References Cited

U.S. PATENT DOCUMENTS

| 5,991,735 A | 11/1999 | Gerace |
| 6,606,102 B1 | 8/2003 | Odom |
| 6,611,842 B1 | 8/2003 | Brown |
| 6,964,022 B2 | 11/2005 | Snowdon et al. |

(Continued)

FOREIGN PATENT DOCUMENTS

| EP | 2226719 | 9/2010 |
| WO | 2006121854 A2 | 11/2006 |
| WO | 2010018451 | 2/2010 |

OTHER PUBLICATIONS

International Searching Authority, International Search Report and Written Opinion, PCT Application PCT/US2014/038502, dated Oct. 7, 2014, 8 pages.

(Continued)

*Primary Examiner* — Matthew T Henning
(74) *Attorney, Agent, or Firm* — Perkins Coie LLP

(57) ABSTRACT

System and computer readable media embodiments of enhanced and flexible login and profile management tools as well as brand owner communication tools are provided which provide more flexibility in regards to information sharing that benefit both users and brand owners and ease the integration of user information into brand owner databases. System and computer readable media embodiments are also provided for an end user to control both how and who uses her personal data. Specifically, these embodiments permit her to authorize which pieces of personal data may be used by particular actors to perform particular tasks. In addition, these embodiments allow the tasks to be performed while simultaneously limiting the number of actor(s)/servers/devices in possession of her personal data.

17 Claims, 19 Drawing Sheets

(56) References Cited

U.S. PATENT DOCUMENTS

| | | |
|---|---|---|
| 7,503,045 B1 | 3/2009 | Aziz et al. |
| 7,809,740 B2 | 10/2010 | Chung et al. |
| 8,108,245 B1 | 1/2012 | Hosea et al. |
| 8,271,894 B1 | 9/2012 | Mayers |
| 8,306,977 B1 | 11/2012 | Gildfind |
| 8,429,527 B1 | 4/2013 | Arbogast |
| 8,620,748 B1 | 12/2013 | Ruarte et al. |
| 8,840,013 B2 | 9/2014 | Roundtree et al. |
| 9,348,979 B2 | 5/2016 | Roundtree |
| 2001/0025271 A1* | 9/2001 | Allen ................. G06F 21/6245 705/65 |
| 2003/0055722 A1 | 3/2003 | Perreault et al. |
| 2003/0061607 A1 | 3/2003 | Hunter et al. |
| 2003/0130951 A1* | 7/2003 | Chess ................. G06Q 20/02 705/50 |
| 2003/0131260 A1 | 7/2003 | Hanson et al. |
| 2003/0144035 A1 | 7/2003 | Weinblatt et al. |
| 2004/0034544 A1* | 2/2004 | Fields ................. G06Q 10/08 705/334 |
| 2004/0088513 A1 | 5/2004 | Biessener et al. |
| 2004/0107147 A1 | 6/2004 | Uemura et al. |
| 2004/0215692 A1 | 10/2004 | Vasudevan et al. |
| 2005/0044569 A1 | 2/2005 | Marcus |
| 2005/0283796 A1 | 12/2005 | Flickinger |
| 2006/0010400 A1 | 1/2006 | Dehlin et al. |
| 2006/0259360 A1 | 11/2006 | Flinn et al. |
| 2007/0067331 A1 | 3/2007 | Schachter et al. |
| 2007/0094083 A1 | 4/2007 | Yruski et al. |
| 2007/0244872 A1 | 10/2007 | Hancock |
| 2007/0257792 A1 | 11/2007 | Gold |
| 2007/0260624 A1 | 11/2007 | Chung et al. |
| 2007/0294091 A1 | 12/2007 | Cohen et al. |
| 2008/0035734 A1 | 2/2008 | Challa et al. |
| 2008/0097867 A1 | 4/2008 | Engle |
| 2008/0126175 A1 | 5/2008 | Alexander |
| 2008/0201734 A1 | 8/2008 | Lyon et al. |
| 2008/0235085 A1 | 9/2008 | Kovinsky et al. |
| 2008/0262908 A1 | 10/2008 | Broady et al. |
| 2008/0270398 A1 | 10/2008 | Landau et al. |
| 2008/0288331 A1 | 11/2008 | Magids et al. |
| 2008/0319862 A1 | 12/2008 | Golan et al. |
| 2009/0006214 A1 | 1/2009 | Lerman et al. |
| 2009/0013268 A1 | 1/2009 | Amit |
| 2009/0018915 A1 | 1/2009 | Fisse |
| 2009/0063551 A1 | 3/2009 | Shuster |
| 2009/0089310 A1 | 4/2009 | Lara et al. |
| 2009/0099932 A1 | 4/2009 | Ahopelto |
| 2009/0106113 A1 | 4/2009 | Arora et al. |
| 2009/0112714 A1 | 4/2009 | Steelberg et al. |
| 2009/0132943 A1 | 5/2009 | Minsky et al. |
| 2009/0234691 A1 | 9/2009 | Steelberg et al. |
| 2009/0271256 A1 | 10/2009 | Toebes et al. |
| 2009/0271283 A1 | 10/2009 | Fosnacht et al. |
| 2010/0057743 A1 | 3/2010 | Pierce |
| 2010/0063872 A1 | 3/2010 | Patel et al. |
| 2010/0094878 A1 | 4/2010 | Soroca et al. |
| 2010/0095372 A1 | 4/2010 | Hodgkinson et al. |
| 2010/0161424 A1 | 6/2010 | Sylvain |
| 2010/0169313 A1 | 7/2010 | Kenedy et al. |
| 2010/0185732 A1 | 7/2010 | Hyman |
| 2010/0262497 A1 | 10/2010 | Karisson |
| 2010/0274887 A1 | 10/2010 | Sanghavi et al. |
| 2010/0293036 A1 | 11/2010 | Meyer et al. |
| 2010/0293569 A1 | 11/2010 | Kusumoto et al. |
| 2010/0306702 A1 | 12/2010 | Warner |
| 2010/0318405 A1 | 12/2010 | Kirkby |
| 2010/0331016 A1 | 12/2010 | Dutton et al. |
| 2011/0024490 A1 | 2/2011 | Kangas et al. |
| 2011/0035263 A1 | 2/2011 | Ramanathan |
| 2011/0055017 A1 | 3/2011 | Solomon et al. |
| 2011/0099064 A1 | 4/2011 | Lyon et al. |
| 2011/0126122 A1 | 5/2011 | Forman et al. |
| 2011/0145039 A1 | 6/2011 | McCarney et al. |
| 2011/0153429 A1 | 6/2011 | Ullah |
| 2011/0161331 A1 | 6/2011 | Chung et al. |
| 2011/0167479 A1* | 7/2011 | Maes ................. G06F 21/6281 726/4 |
| 2011/0215162 A1 | 9/2011 | Challa et al. |
| 2011/0219448 A1 | 9/2011 | Sreedharan et al. |
| 2011/0288913 A1 | 11/2011 | Waylonis et al. |
| 2011/0295664 A1 | 12/2011 | Flinn et al. |
| 2011/0295665 A1 | 12/2011 | Flinn et al. |
| 2011/0295696 A1 | 12/2011 | Flinn et al. |
| 2011/0295699 A1 | 12/2011 | Flinn et al. |
| 2011/0295703 A1 | 12/2011 | Flinn et al. |
| 2011/0319059 A1 | 12/2011 | Padeh |
| 2012/0029986 A1 | 2/2012 | Jalili |
| 2012/0038665 A1 | 2/2012 | Strietzel |
| 2012/0130822 A1 | 5/2012 | Patwa et al. |
| 2012/0166433 A1 | 6/2012 | Tseng |
| 2012/0260322 A1 | 10/2012 | Logan et al. |
| 2012/0311689 A1 | 12/2012 | Kron et al. |
| 2012/0323704 A1 | 12/2012 | Steelberg et al. |
| 2012/0331567 A1* | 12/2012 | Shelton ................. G06F 21/6245 726/28 |
| 2013/0018698 A1 | 1/2013 | Parnaby et al. |
| 2013/0018838 A1 | 1/2013 | Parnaby et al. |
| 2013/0018957 A1 | 1/2013 | Parnaby et al. |
| 2013/0054366 A1 | 2/2013 | Roundtree et al. |
| 2013/0075464 A1 | 3/2013 | Van Horn et al. |
| 2013/0085847 A1 | 4/2013 | Dyor et al. |
| 2013/0085848 A1 | 4/2013 | Dyor et al. |
| 2013/0085849 A1 | 4/2013 | Dyor et al. |
| 2013/0085855 A1 | 4/2013 | Dyor et al. |
| 2013/0086499 A1 | 4/2013 | Dyor et al. |
| 2013/0117375 A1 | 5/2013 | Bist et al. |
| 2013/0124628 A1 | 5/2013 | Weerasinghe |
| 2013/0132197 A1 | 5/2013 | Toebes et al. |
| 2013/0144710 A1 | 6/2013 | Roundtree et al. |
| 2013/0144711 A1 | 6/2013 | Roundtree et al. |
| 2013/0151339 A1 | 6/2013 | Kim et al. |
| 2013/0161381 A1 | 6/2013 | Roundtree et al. |
| 2013/0167085 A1 | 6/2013 | Roundtree et al. |
| 2013/0179362 A1* | 7/2013 | Rhyan ................. G06Q 10/08345 705/335 |
| 2013/0191205 A1 | 7/2013 | Harkless, II et al. |
| 2013/0268357 A1 | 10/2013 | Heath |
| 2013/0291123 A1 | 10/2013 | Rajkumar et al. |
| 2013/0326357 A1 | 12/2013 | O'Donnell et al. |
| 2014/0052527 A1 | 2/2014 | Roundtree |
| 2014/0067542 A1 | 3/2014 | Everingham |
| 2014/0068722 A1 | 3/2014 | Hayat et al. |
| 2014/0079225 A1 | 3/2014 | Jarske et al. |
| 2014/0108142 A1 | 4/2014 | Toebes et al. |
| 2014/0129344 A1 | 5/2014 | Smith et al. |
| 2014/0136606 A1 | 5/2014 | Roundtree |
| 2014/0278992 A1 | 9/2014 | Roundtree et al. |
| 2015/0281878 A1 | 10/2015 | Roundtree et al. |

OTHER PUBLICATIONS

European Patent Office, Extended European Search Report, EP Patent Application 12797069.7, dated Oct. 2, 2014. 7 pages.

International Search Report and Written Opinion for PCT/US2012/041178, Applicant: Nfluence Media, Inc., dated Aug. 17, 2012, 6 pages.

International Search Report and Written Opinion for PCT/US2012/068319, Applicant: Nfluence Media, Inc., dated Apr. 5, 2013, 21 pages.

International Search Report and Written Opinion for PCT/US2013/032643, Applicant: Nfluence Media, Inc., dated Jun. 7, 2013, 10 pages.

International Search Report and Written Opinion for PCT/US2013/069766, Applicant: Nfluence Media, Inc., dated May 13, 2014, 8 pages.

International Searching Authority, International Search Report and Written Opinion, PCT Patent Application PCT/US2016/035576, dated Feb. 23, 2017, 11 pages.

\* cited by examiner

INTENTIONALLY LEFT BLANK

FIG. 4

INTENTIONALLY LEFT BLANK

FIG. 5

INTENTIONALLY LEFT BLANK

FIG. 6

INTENTIONALLY LEFT BLANK

FIG. 7

INTENTIONALLY LEFT BLANK

FIG. 8

INTENTIONALLY LEFT BLANK

FIG. 9

INTENTIONALLY LEFT BLANK

FIG. 10

CONSUMER AND BRAND OWNER DATA MANAGEMENT TOOLS AND CONSUMER PRIVACY TOOLS

RELATED APPLICATIONS

This application is a continuation-in-part application of U.S. application Ser. No. 14/078,515 filed Nov. 12, 2013, which claims benefit of and priority to U.S. Provisional Patent Application No. 61/724,863 filed Nov. 9, 2012, both of which are herein incorporated by reference in their entireties.

The following previously filed applications are herein incorporated by reference:
U.S. Provisional Patent Application No. 61/493,965;
U.S. Provisional Patent Application No. 61/533,049;
U.S. Provisional Patent Application No. 61/506,601;
U.S. Provisional Patent Application No. 61/567,594;
U.S. Provisional Patent Application No. 61/597,136;
U.S. Provisional Patent Application No. 61/603,216;
U.S. Provisional Patent Application No. 61/683,678;
U.S. Provisional Patent Application No. 61/724,863;
U.S. patent application Ser. No. 13/490,444, entitled "CONSUMER DRIVEN ADVERTISING SYSTEM";
U.S. patent application Ser. No. 13/490,449, entitled "SYSTEM AND METHOD FOR DELIVERING ADS TO PERSONAS BASED ON DETERMINED USER CHARACTERISTICS";
U.S. patent application Ser. No. 13/490,447, entitled "METHOD AND APPARATUS FOR DISPLAYING ADS DIRECTED TO PERSONAS HAVING ASSOCIATED CHARACTERISTICS"; and
International patent application Ser. No. PCT/US12/41178, entitled "CONSUMER DRIVEN ADVERTISING SYSTEM".

The technology described in these applications as well as the current application are interoperable.

APPENDICES

Appendix A has a description of technologies described in the incorporated applications.

BACKGROUND

Currently, consumer users of email, e-commerce sites and other services provided by brand owners lack tools to efficiently and conveniently manage their account information across multiple brand owners. Specifically, users lack an ability to easily access said accounts and to meaningfully manipulate information in said accounts, in order to facilitate better delivery of meaningful and personalized content via their choice of brands.

What is specifically needed are enhanced and flexible login and profile management tools as well as brand owner communication tools that provide more flexibility in regards to information sharing that benefit both users and brand owners and ease the integration of user information into brand owner databases.

In addition, consumer privacy has become a paramount concern of society. High profile data breaches of consumer data have created a heightened awareness of the importance of data privacy and security. What is needed are preventative tools to minimize the number of devices and servers that store or maintain direct access to consumer personal data as well tools to ensure that merchants and others have all of the capabilities possible from storing or having direct access to personal data while continuing to use consumer data in an authorized manner at all times.

BRIEF DESCRIPTION OF THE DRAWINGS

FIGS. 4-10 are intentionally left blank;

DETAILED DESCRIPTION

Figure 1:
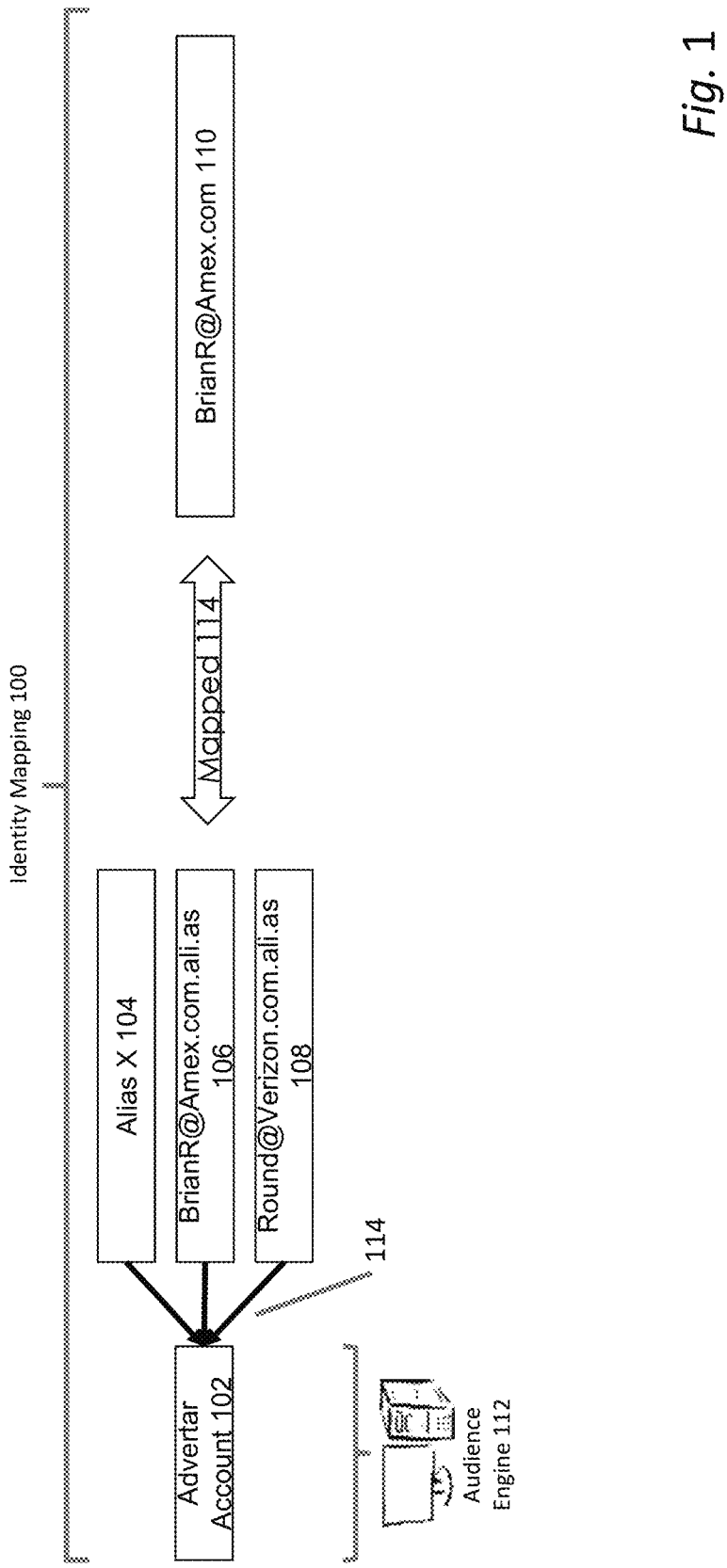
FIG. 1 illustrates an exemplary embodiment of identity mapping.

Consumer and Brand Owner Data Management Tools
Profiles and Interest Graphs Primer As discussed in previous patent applications, advertars and profiles of a user may reflect demographics/characteristics and associated probabilities of a user having said demographics/characteristics among other information. Interest graphs may be a part of a profile.

As opposed to a social graph (which may also be included or may contribute to a profile) an interest graph focuses on shared interests regardless of personal connections while a social graph focuses on connections based on personal connections. (In some embodiments, profiles may incorporate social graphs as well or just social graphs alone).

In one embodiment, an interest graph refers to the specific and varied interests that form one's personal identity, and the attempt to connect people based on those interests. Individually, this may mean different things. One person is interested in be it jogging, celebrity gossip, or animal rights—that make up likes and dislikes, and what has more meaning to them over someone else. On a broader scale, it's the way those interests form unspoken relationships with others who share them, and expand to create a network of like-minded people.

While the social graph consists of who a user knows, the interest graph consists of what they like, what moves them, and the facets of their personality that, in part, make up who they are. These interests can be represented in an interest graph by an interest graph node, and the probabilities of each interest and between interest nodes may also be incorporated into interest graphs. These connections can be much stronger, and much more telling, than simply who they are friends or acquaintances with. For example, two people being linked together because they knew each other in elementary school or work at the same job doesn't necessarily indicate anything about them beyond their connection to each other. And for the people involved, it doesn't always foster a very strong or lasting connection. As such, an interest graph may offer more insight into each person's personal tastes, preferences and behaviors.

Thus, given users X connected in an interest graph, the X users likely are more interested in the same advertising as opposed to users who are not. In addition, characteristics and associated characteristics (e.g., via a taxonomy) of those users can be studied and offers, products and other goods/services can be developed specifically for those demographics. This provides a highly personalized experience and also connects a user to users who have characteristics in common.

OAuth, ID Verification & Mapping Information to Profiles/Identities

One useful data management tool is OAuth (Open Authentication) which can be applied to Advertar accounts to enable login, ID verification and information sharing (e.g., sharing of a user's interest graph/profile) between accounts of different providers such as different brands like the GAP™ and Costco™. Specifically the tools may allow users to use existing account(s) data such as an account email to sign into multiple accounts of other brand owners without new passwords or require input of new account information such as brand preferences, SWOTE information, deals bought, looked at and other information associated to a profile such as an Advertar.

Another data management tool, identity mapping serves to map information to profiles/identifies, Mapping makes integration of the user's information easier into the brand owner's existing database. For instance, pre-existing user identities such as existing emails in a brand owner's database might end with @amex.com could be easily mapped to addresses with common suffixes such as username.amex.com.Ali.As or any other identifier for ease of mapping integration. This will reduce cost and confusion and consumer reliance on imperfect technologies like email filters. Mapping with domain names takes advantage of addresses on the internet such as domain names, sub-domain names and email addresses which are unique and thus avoids conflict.

In another case, an address ending with @amex.com could be mapped to an address with a different common suffix such as username@amex.com.ali.as. A variety of suffix variations are contemplated that could at least comprise any domain name. For example, in one variation the above address could be username@amex.com.nfluence.com or username@amex.com.0mail.com.

For instance in the latter case above with username@gamex.com.ali.as, in the example, a user, Brian has multiple email addresses associated with different vendors (BrianR@gamex.com, Round@verizon.com), To allow the vendors a simple way to contact the advertar for their use, it is agreed that a suffix or other differentiator may be added to the email addresses they have for the user so that Amex knows it (or others it wishes to share the new email address with) can contact the advertar for Brian at the new address of BrianR@amex.com.ali.as. Verizon knows it can contact the advertar for Brian at Round@verizon.com.ali.as.

The user Brian, can therefore log into a single email server with a single user name/password (here for Amex related emails, the server with the sub-domain and domain amex.com.ali.as) and get messages from each vendor from the new addresses created above.

To do the mapping in this embodiment, each vendor or other actor associates the e-mail address or at least a portion of it, for their customers having advertars with appended suffixes such as verizon.com.ali.as which refers to an email server that will receive emails from this domain. On this email server, an audience engine or other server such as the vendor server or a combination of these, a record is kept of each alias email address associated with a particular advertar and the service provider/vendor's (in this case Verizon) email of the user such as Round@verizon.com as well as optional persona information or this information may be stored on a remote server.

Figure 11:
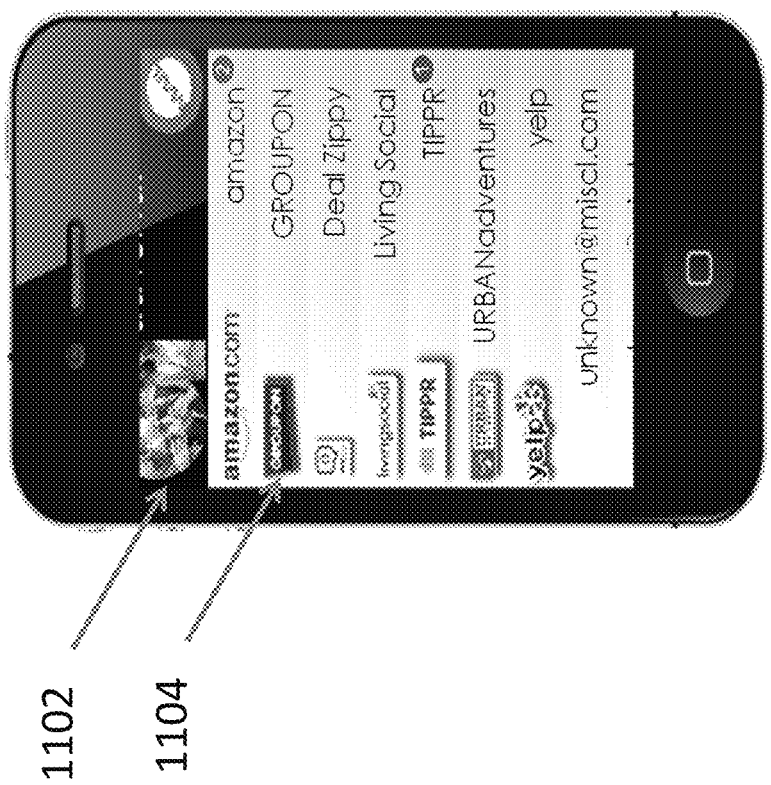
FIG. 11 illustrates one embodiment of a representative user interface screen displaying a persona's email program.
Figure 12:
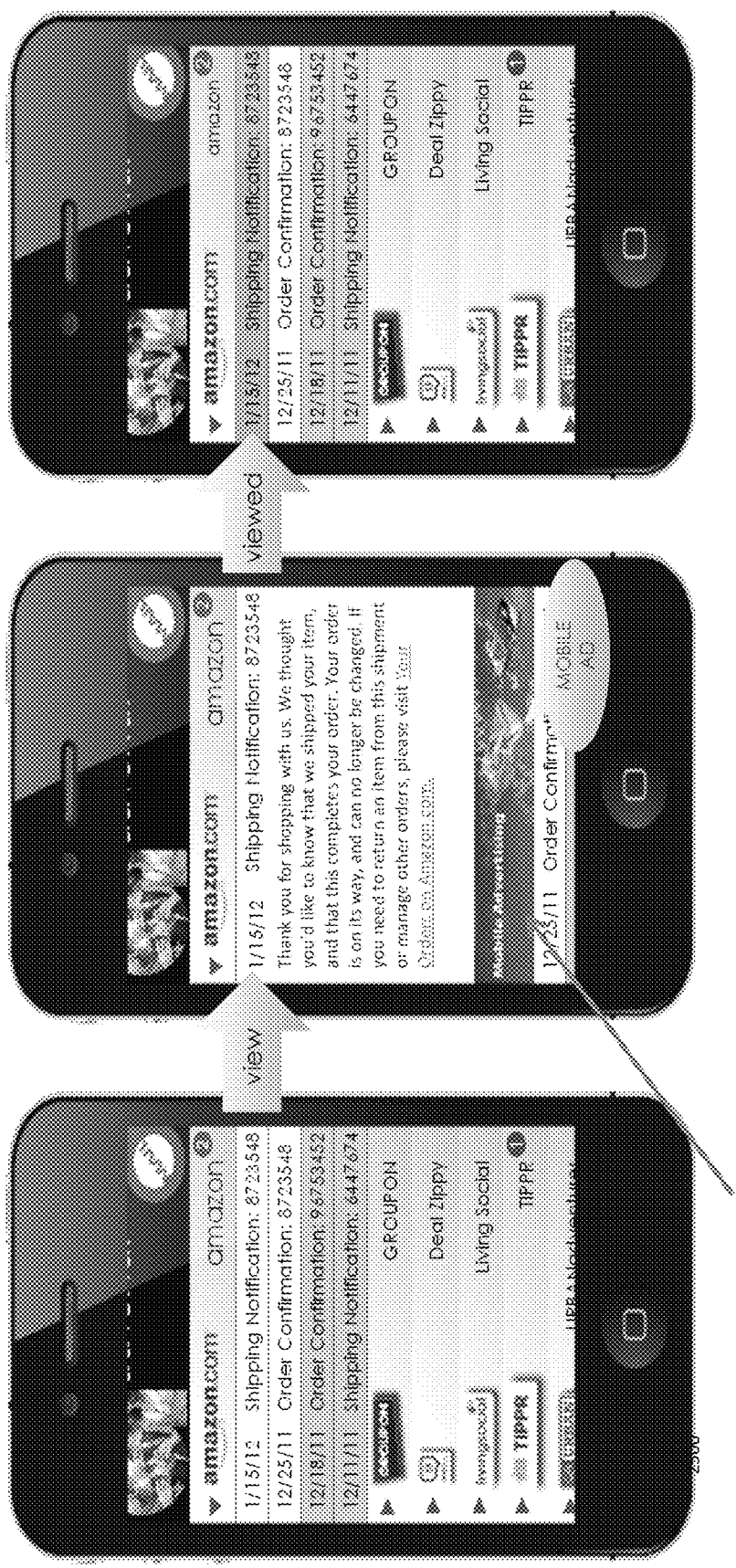
FIG. 12 further illustrates one embodiment of a representative user interface screen displaying a persona's email program.

An email client running on the user's device (phone, laptop, iPad etc.) may then log into the alias email and see email sorted by each vendor such as via the sub-domain/domain (e.g., the. Amex or Verizon in the amex.com.ali.as and verizon.com.ali.as respectively) as shown in FIGS. 11 and 12.

These tools make it more convenient for the user to interact with different services such as accounts the user has with different brands. This ease of interaction enhances consumers' freedom between services/brands. For instance, via the disclosed data sharing tools, a user can interact (e.g., login and share her information from her Advertar) with a plurality of brands without laboriously duplicating information for each different brand or take her information altogether away from the brand by restricting access) or request the information on the brand servers be deleted and then easily share the information to another service as conveniently discussed above e.g., easily migrating from the Apple™ Ecosystem to the Google™ Ecosystem.

In addition, these sharing tools also enhance information sharing between the brand owners themselves via a central profile such as an advertar. This provides enhanced analytics as a profile with information gathered across multiple brands often includes significant consumer information that cannot be collected from a single brand alone. This aggregated data may be shared or auctioned across the brands to monetize the ability to provide the user with more relevant ads etc. This information may also be altered by the user in a like manner.

In addition through these data sharing tools, pre-existing information about each of the users that each brand has (e.g., past purchase information) may be shared with the Advertar profile and other brands which supplements the Advertar profile's existing information such as brand sorting preferences, likes, don't likes, would buy, geographic information, spend graphs etc.

Access to the Advertar or portions of the Advertar may be monetized to brands accordingly. As discussed below in relation to FIG. 2, each brand may take the desired portions of the Advertar they have and personalize their own marketing platforms in order to, for example, offer custom ads to each Advertar user, perform analytics (e.g., mobile analytics), ask further questions based off this information or offer other services to the consumer.

In addition, a verified identity to a user used with OAuth or alternately the use of OpenID or the combination of these tools, across services may be very valuable. Verification with a telecom carrier, advertiser, merchant or other entity is valuable as it may verify the identity of the user, her credit card/history, physical address, social security number, contact information etc. This information may be used as preexisting information to base a profile on—such as an Advertar or be kept private.

A verified ID as discussed above, associated to an Advertar profile also presents a user with an easy way to interact with different brands conveniently by letting her profile (or desired portions of the profile) be shared with each brand to enhance services. On the brand side, the value of this verified Advertar profile is increased in value as payment execution may be conducted since the account is/can be verified which makes contact between the brand and consumer much closer and easier for the consumer to purchase an item. In addition, given this increase in consumer convenience, the consumer will interact more with the advertar, thus increasing the amount of information in a profile which produces a "smarter" profile over time and thus better services to the consumer.

Identity Mapping

FIG. 1 illustrates an embodiment of identity mapping 100 associated with an Advertar. Here, an Advertar account 102 which may be on audience engine 112 or other server and (discussed in the related provisional, utility and international patent applications referenced above) is associated to multiple aliases 104, 106, 108. Alias 108 is round@verizon.com.ali.as while alias 106 is illustrated as brianr@amex.com.ali.as. Here, alias 106 is mapped 114 to an existing account brian@amex.com 110. In this example, alias 106 was created by using the domain of "amex.com" as a sub-domain—of "amex.com" of the "ali.as" domain. Thus, a new domain of "ali.as" was added to indicate a new server to deliver data to via this address. As illustrated, different brand owners/brands/vendors/service providers may each be issued/generate or otherwise use different aliases that deliver their email to the same domain e.g., Amex was given an alias with an Amex sub-domain, Verizon was issued an email with an alias with a Verizon sub-domain etc, in another embodiment, in place of email addresses in elements 110, 106 and 108 account names (such as just "brianr" in place of element 110), phone numbers or other identifiers/globally unique identifiers, or a combination of these may be used. In yet another embodiment, a separate non-vendor (e.g., a preexisting identifier not issued by Amex or Verizon) issued address such as brianr@gmail.com which may have been associated to the brianr@amex.com account (such as during account creation when he initially signed up with the Amex service) may be mapped to brianr@amex.com which may in turn be mapped as above. Thus brianr@gmail.com may be used in substitution or mapped to brianr@amex.com 110 and/or used to create a new email address: BrianR@gmail.com.amex.com.ali.as or other identifier as desired.

This mapping, provides an easy way for Amex or other brand to take an existing account such as the amex.com account and map it by adding a ".ali.as" or other suffix and integrate it into their database. Address prefixes such as the "local part" may be altered as desired or kept the same. Sharing and/or aggregation of the data tied to these alias/advertar account can be through the third party server at alias in which the aliases with ali.as may be interacted with.

In one embodiment, given the above mapping which is recorded and stored at any different number of servers, a user can login into their Advertar account in any variety of ways such as with an advertar email account or a new alias as created above or any other data mapped to this information.

A user may now access the advertar account data through any of the email addresses that may be or have been provided by the brands, a new account directly with the advertar server or other IDs such as those illustrated in FIG. 1 or information associated to the Advertar input at the vendor's servers (assuming the vendor has the mapping and associated data) etc. Thus these may be treated as common IDs of which any can be chosen to access the advertar account and the various brand accounts associated with the advertar. The merchants/brands in possession of each of the accounts may or may not have access to the advertar account or other merchant/brand account information or have partial access as the user sees fit. Access can be determined by how much of the mapping information a particular server has. Thus these tools provide a common credential to be used among for any of the user's accounts.

In yet another embodiment, instead of email addresses, phone numbers may be used in a manner like the above. For instance an area code prefix such as (206) for Seattle, Wash. and/or a country code may be treated similar to a domain above and the remainder of the number may be treated as a username as in the manner the above.

Embodiments of Identity Mapping

In one embodiment focusing on protecting a user's personally identifiable information that may occur in an email address "local part" e.g. a username@, the following may occur. First a user's existing email such as brian.roundtree@costco.com, which contains personally identifiable information is used as the base to create a new email address. In one example, personally identifiable information such as brian.roundtree is stripped off. In place, is inserted an anonymous ID such as a random identity or a new identity may be created and based off of the original brian.roundtree information through a variety of algorithms/tools. In this example a random sequence: 1234 is chosen to replace brian.roundtree. In addition, a new domain is also added "ali.as" to the new address: 1234@costco.com.ali.as, while the previous domain of Costco.com is now a sub-domain of the new address.

The relationships between the advertar account, the brian.roundtree@costco.com account and the 1234@costco.com.ali.as are mapped, recorded and optionally stored on the audience engine or any other device such as the Costco server. Portions of these mappings may not be shared to protect the user's privacy. The mapping of original Costco email, the advertar name and the new address may be stored on the audience engine, Costco server or other device.

Thus this new email may give Costco a direct way to communicate with the user through her advertar. For instance, the 1234@costco.com.ali.as email address may then be provided to other actors, such as other advertisers, which gives them an address to communicate with the user via the ali.as server without compromising the user's real email address brianround.tree@costo.com or the personally identifiable information contained in this address. Here, the mapping of the brian.roundtree@costo.com address, the advertar and the 1234@costco.com.ali.as email address is not shared with the other actors to preserve confidentiality.

Upon receipt of an advertiser email addressed to the new address at the costco.com.ali.as server, the mapping is accessed and associated to the advertar and optionally the vendor/brand/merchant/service provider/advertiser (e.g., Costco) email. The consumer may login into the costco.com.ali.as server or other server connected and authorized to view and easily manage the entails with her advertar.

Moreover, if spam or other spurious/unwanted email is received at the 1234@costco.com.ali.as address, then the consumer will know that that particular email address from Costco may have been compromised and that email address may be ignored, terminated and another one issued in replacement.

In addition, given that the 1234@costco.com.ali.as address is from a user glancing at the address, clearly associated to Costco.com, the user may instantly recognize that the address is Costco related.

Additional Mapping Tools

A persona, email, IP address, phone number, device ID, UDID, software ID, software installation ID or other identifying information can be mapped to alternate information for identification and/or other information dissemination purposes.

In one embodiment, as discussed in the above referenced patent applications, a persona is created. A user may wish to map/associate her email, phone number, webpage etc. to her persona. For instance, when an advertiser or other entity acquires her email, the advertiser may via the email and identity mapping, examine her persona and target only ads relevant to that particular profile to said email, This may be done by accessing a server such as the audience engine via the user's information to access the persona via the mapping. In other words, the consumer may choose the identifier that a brand may examine and the information the brand owner examines.

In another embodiment, a consumer's home IP (Internet Protocol) address is associated to her profile or other information she desires to be made accessible. The association can be through a central database on any server or may be done at the ISP level. When an advertiser/brand or other entity acquires her IP address e.g., when a consumer interacts with the advertiser's servers, the advertiser may examine her profile via mapping/associations on the above central database (e.g., on, an audience engine) before sending targeted information.

In yet another embodiment, the persona can be integrated into a web browser or application (e.g., mobile application) for association by an entity such as an advertiser to a particular user, Here, when the user interacts with a server associated to the advertiser, the advertiser may access the available information in the browser (e.g., such as an interest graph) or stored elsewhere on the client or remotely via identity mapping with her the web browser's software ID or software installation ID and send information tailored to the user's profile.

OAuth and User Verification

Figure 2:
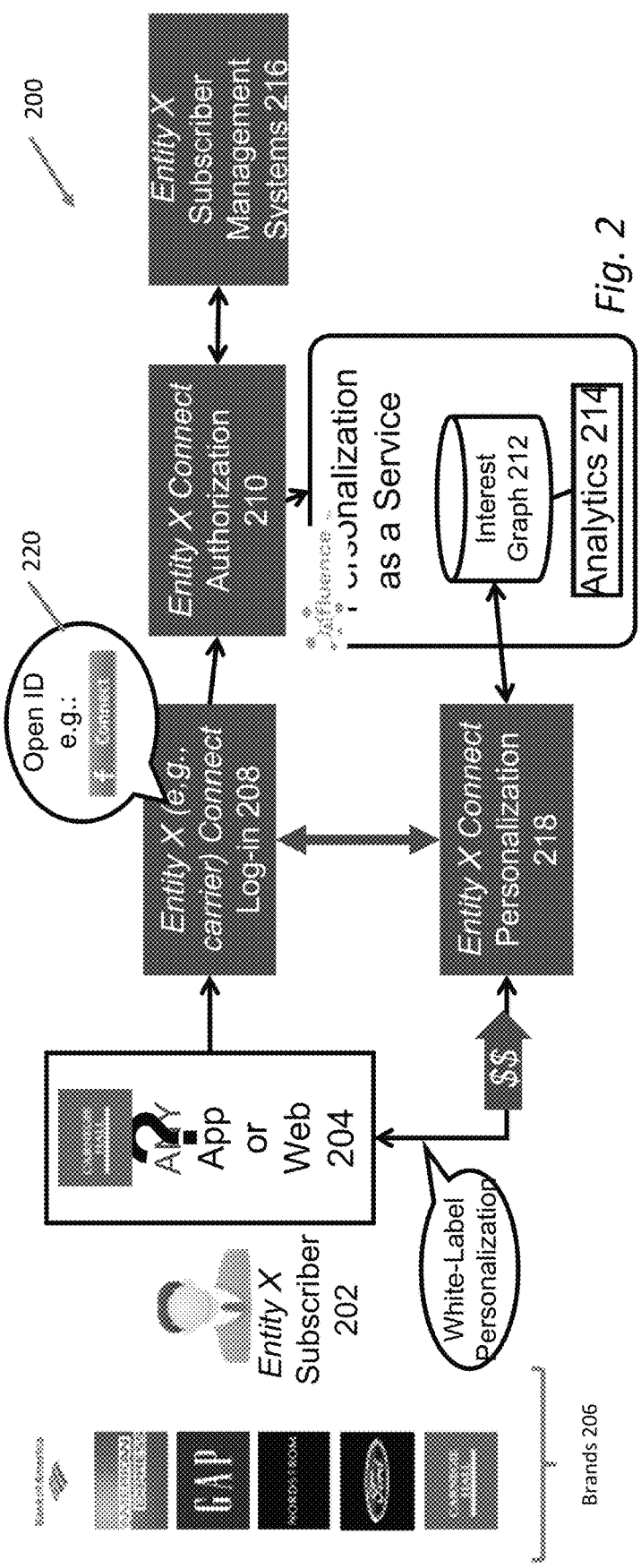
FIG. 2 illustrates a system whereby a user can verify her identity, authorize and receive personalized ads in accordance with an embodiment of the disclosed technology.
Figure 3:
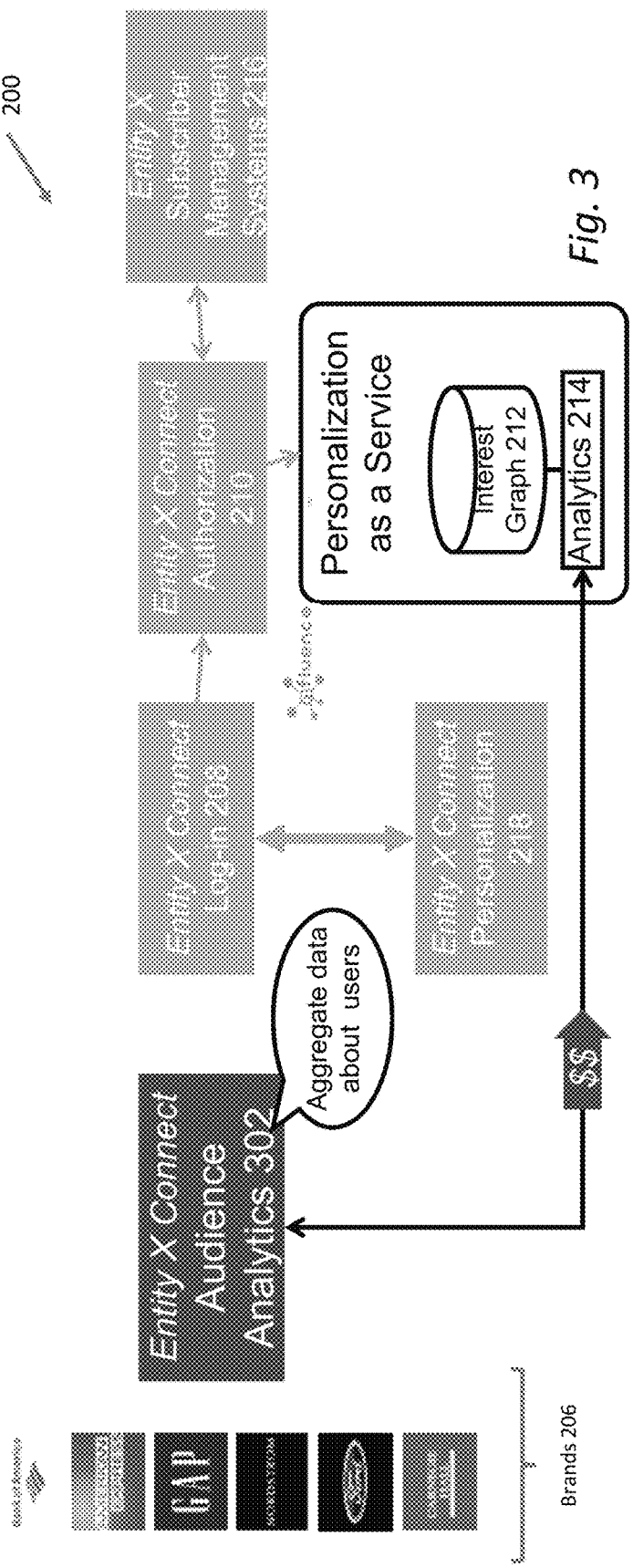
FIG. 3 illustrates another system whereby a user can verify her identity, authorize and receive personalized ads in accordance with an embodiment of the disclosed technology.

FIGS. 2-3 illustrate an embodiment 200 in which Entity X (such as a carrier, vendor, merchant, brand, service provider, advertiser etc,) interacts with an nFluence server which serves to store Advertars with the tools above. Entity X uses white labeled software, distributes it to consumers to input/collect data, interact with an advertar on an interest graph 212 and resells information to its brand clients such as the GAP, AMEX, etc.

More specifically, FIG. 2 illustrates a subscriber 202 such as a user that is using a brand's white labeled mobile application or web-plugin 204. The user may then enter her ID such as her Advertar, email, IP address, device ID, UDID, software ID, software installation ID or other ID at 204. Via OAuth, OpenID or both, a server such as Facebook™ via Facebook. Connect as illustrated at 220 as "f connect" or other similar service/server may verify her login ID by the login at 208. Upon successful login, access to other servers such as an audience engine storing an advertar and interest graph 212 may occur.

At 210, the user may further be authorized which gives the user permission to share the interest graph, parts of it, share information from the account the user is logged into in the mobile application 204, input information etc.

The subscriber management systems at 216 may manage/administer some or all of the operations of this embodiment 200. At 218, the user's interest graph may be examined or supplemented with information from the Management systems 216 or input from the subscriber's application 204, At 218, appropriate ads/offers or content may be determined based off the user's interest graph 212 as discussed in the above referenced patent applications. Once decided, personalization may occur at 218 and the appropriate ads and other content may be sent to the subscriber 202 via application 204.

In addition, the audience engine (labeled "Personalization as a Service") may examine the interest graph 212 for analytical purposes 214 to better learn about the subscriber, the demographics and characteristics she may have, others in the same audience who may share them as discussed in the above referenced patent applications.

Alternately as illustrated, operation 210 may be omitted. Subscriber 202 may login via an OAuth at 208 and at 218, receive personalization such as custom tailored content based on her interest graph 212.

Also as illustrated, the illustrated shapes with "Entity X" may be a brand such as "Carnegie Hall" brand who is illustrated as the distributor of the application 204 or any other brand as in brands 206. As illustrated, the blocks 204, 208, 210, 216 and 218 all indicate "Carnegie Hall" or another brand is operating/managing the various operations from the management systems 216. In another embodiment, some of these operations could be run by third parties such as any merchant, service provider, carrier etc., on various different devices connected by a network. Entity X at 218 and other entities in the figure, may receive compensation for this service in any variety of ways.

As illustrated in FIG. 3, the audience data collected from various users at 214 in FIG. 2, may be aggregated at 302 by an audience analytics server. This data gathered as discussed above from a plurality of users over multiple brands 206 via the illustrated tools (e.g., each brand having its own white labeled mobile application) can be aggregated on the audience engine or elsewhere, Audience data aggregation, analytics and other computations are disused in the above referenced patent applications.

Alternative to OAuth Verification

In another user verification example, a one-way hash can be used in place of the OAuth at each server the consumer wishes to share her advertar with while allowing her login and other information to remain private.

For instance, a one way hash of an advertar's login credentials such as her advertar name or advertar email address or any other information may be used to create the hash. The hash is associated with her advertar, any address or login and the information that created the hash is discarded. The hash serves to verify that the user entering the original information at least had access to the original information. In other words, the one way hash verifies that a user with access to the information that created the hash is inputting the information. In addition, since the original information was discarded or otherwise kept private, the original information itself cannot be replicated from the hash.

The hash and associated/mapped information such as various account names, emails and other data may then be distributed to various servers that the user wishes to share her advertar with. For instance, Amex, Costco and Verizon may each receive the hash and accompanying algorithm(s)

to create the hash and associated data. For example, the hash may be associated to her existing accounts e.g., her Amex email account.

A user may then log into each of the above Amex, Costco and Verizon servers with the information she created the hash with, such as her advertar email account at all of these servers. For instance, upon a user inputting her advertar email and/or password at Amex's website, a hash is created using the same or similar algorithm that originally created the hash before distribution. The input information such as an advertar email at the Amex server or other server is discarded to keep her input private. The resulting hash is compared to the hash that was distributed above. A matching hash is then found via the above mapping to be associated to her Amex email, which is associated to her Amex account. Thus the user has verified her identification and the user may access information on her Amex account, information on her advertar account etc. without compromising her privacy.

An exemplary interface that may be shown to the user while creating the hash is to display the hash being created in real time in response to information she enters. For example if she enters "X" into a device creating the hash by a hashing algorithm, such as a mobile device in communication with the audience engine. Here, in response, to "X", a one way hash character, "Y" can be displayed which was created by a hash algorithm. Any number of hash creating algorithms may be used to create the hashes.

Consumer Privacy Tools

Overview

Disclosed are tools for an end user to control both how and who uses her personal data. Specifically, these tools permit her to authorize which pieces of personal data may be used by particular actors to perform particular tasks. In addition, these tools allow the tasks to be performed while simultaneously limiting the number of actor(s)/servers/devices in possession of her personal data.

To this end, the tools permit relying parties such as merchants, to request execution of a task using end user (e.g., consumer) personal data in an end user authorized manner without the relying parties having access or storing end user personal data. More specifically, the tools permit an end user to authorize a relying party to execute a task using the end user's personal data via a task provider such as a personal data controller service. Said task provider may be in possession or have access to the end user personal data and is configured to execute the task on behalf of the relying party contingent upon end user authorization to execute the task with particular personal data as well as allowing the user to require other execution conditions/parameters.

This minimization of the number of actors in possession of her personal data reduces the risk that a data breach by hackers or other means would comprise her private information. In one embodiment discussed below, the consumer may choose to give her personal data to task providers such as shippers like FedEx® and not give personal data to merchants, thus reducing the number of servers in possession of her physical address and other personal data.

In addition, the disclosure includes ability for the end user or others to withdraw authorization to a task she previously authorized at various points in the above introduced steps.

Definitions:

As used herein, end user personal data/information (also called personal data/information) may comprise any data that can be used on its own or with other information to identify, contact or locate a single person, or to identify on individual in a context. This data may comprise many types of data such as data types accepted as Personally Identifiable Information (PII), part of a full name, home address, email address, national identification number (e.g., social security number), passport number, IP address, device ID, software install ID, vehicle registration plate number, driver's license number, biometric data, credit card number, date of birth, birthplace, telephone number, login name, nickname, secret question, any account/transaction number, products/goods/services purchased, associations to other individuals or groups, race, gender, grades, salary, criminal record, security information (e.g., password, security code, pin number), medical history and/or any combination of these data types.

As used herein, a task may comprise any action executed, initiated or caused to be executed, by a task provider such as a personal data controller service that has end user authorization for execution (discussed below), Said actions may comprise, delivery/creation of: a good/service/data/A.I. model to a physical or electronic address, social network address, social network data, current location, path planning, location history, location check-ins, predictive services, personal contacts or address book, calendar as well as execute telephonic calls, SMS messaging, sharing of data, scheduling an appointment, placing a reservation or any other action an end user wishes to execute. The task may be executed using the end user's personal data.

As used herein, task parameters/conditions may comprise any conditions that an end user or any of the various services/devices disclosed herein may impose on the execution of the task. This may comprise a number of times the task can be executed (e.g., personal data token or limited use access token, or even unlimited and perpetual use in the public domain), a time/location requirement for task execution e.g., time windows/expiry dates, task use limitations e.g., tasks that the personal data may be used for (e.g., sharing, public display, partial disclosure of information, delivery of data/goods etc.) authorized personal data controller services and other providers that may execute the task, place limitations on what personal data can be used to execute the task, or require that a task execution be required by a particular relying party etc.

As used herein, federated identity service may be comprised of single sign technologies on such as SAML (Security Assertion Markup Language), OAuth, OpenID, OpenID Connect, Security Tokens (Simple Web Tokens, JSON Web Tokens, and SAML assertions), Web Service Specifications, Microsoft Azure Cloud Services, or Windows Identity identity provider services, any similar technologies and/or any combination of these technologies. The federated identity service may perform a service similar to that of an identity provider/identity assertion provider that may be responsible for providing identifiers for users trying to interact with a system, asserting to such a system that the identifier presented by a user is known to the provider and/or providing other information about the user that is known to the provider. In one example, an authentication service such as that within a federated identity service may provide and/or verify a token that is used instead of a user repeatedly explicitly authenticating herself within a security realm. E.g., a website that allow users to login with a Facebook® credential in which Facehook acts as an identity provider. In one example, Facebook verifies that the user is an authorized user and returns information to the website such as a username and email address.

As used herein, OpenID is a technology that may be used in single sign-on/federated identity systems which is an open standard and decentralized authentication protocol promoted by the non-profit OpenID Foundation. It allows an end user to be authenticated by cooperating sites (e.g., relying parties) using third party services. This may eliminate the need for a webmaster to provide their own ad hoc login systems while allowing an end user to log into multiple unrelated websites without having to have a separate identity and password for each website. In one embodiment, OpenID provides assert and verify functions for an end user but typically does not provide granular control over her personal data associated with her account.

As used herein, OAuth is a technology that may be used in single-sign-on/federated identity systems which is an open standard for authorization which may be commonly used as a way for an end user to log into a third party website using for example Facebook, Google® or other accounts without exposing their passwords. OAuth was designed to work with HTTP protocol to allow access tokens to be issued to third party clients by an authorization server with the approval of the resource owner. The third party can then use the access token to access a protected resource on the resource server. In one embodiment, OAuth may provide an authorization function for the end user and typically may allow granular control over data associated with her account once her identity is established.

As used herein, a token comprises any data created via tokenization. Tokenization is the process of substituting sensitive data elements with a non-sensitive data equivalent (e.g., a token). Said token may have no extrinsic or exploitable meaning or value, The token may serve as a reference/ identifier that maps back to the sensitive data through a tokenization system. Such examples may be using a token as a transaction identifier e.g., identifies an end user's request such as her purchasing a good/service. The mapping from the original data to a token may use a method, which renders the token infeasible to reverse without the tokenization system, The token system may be secured and validated using security best practices applicable to sensitive data protection, secure storage, audit, authentication and authorization. The tokenizsation system may provide data processing applications with the authority and interfaces to request tokens or detokenize back to sensitive data.

The security and risk reduction benefits of tokenization may require that the tokenization system be logically isolated and segmented from data processing systems and applications that previously processed or stored sensitive data replaced by tokens. Optionally, only the tokenization system can tokenize data to create tokens, or detokenize back to redeem sensitive data under strict security controls. The token generation method should be proven to have the property that there is no feasible means through direct attack, cryptanalysis, side channel analysis, token mapping table exposure or brute force techniques to reverse tokens back to live data.

In addition, the personal data or other data may differ between various services and devices that receive the same token. Specifically, a first service may have more or less personal data that maps to a token as opposed to a second service. The mapping may be facilitated between different services and devices that receive the token via a preconfigured relationship described below or other tools. In one embodiment, the token may have information encoded within the token itself e.g., the first four numbers in a credit card determine if it is a VISA®, Master Card® etc. In this manner, the type of action to execute upon receiving a token, type of personal data or other information can be encoded and help the holder of the token associate it with information as well as the above functionality. In another embodiment, the token received by a service/device can be understood by the receiving service/device by recognizing the token via the aforementioned preconfigured relationship in which information from another service/device about the token is received and remapped to the token. The remapped token's associated information can tell the receiver what information it is associated with and thus, what actions to execute with it based on the preconfigured relationship or other tools.

As used herein, services may be any workflow including but not limited to as an authentication workflow or workflow to create tokens etc. A single service may be performed on a single device/server or multiple services may be performed on a single device/server etc.

As used herein, a URL (Uniform Resource Locator) may be any location/address such as a reference to a web resource that specifies a location on a computer network and mechanism for retrieving it. A URL may be a type of Uniform Resource Identifier (URI). In some embodiments a URL may be a reference to web pages (http), but may also be for file transfer (ftp), email (mailto), database access (JDBS) or to other applications. In one embodiment of the disclosed tools, a URL allows a mobile device application to determine what service to execute. This may be done in the background (not visible to the end user) or foreground (e.g., shown on the screen to the end user or can be displayed in a specific screen).

Figure 15:
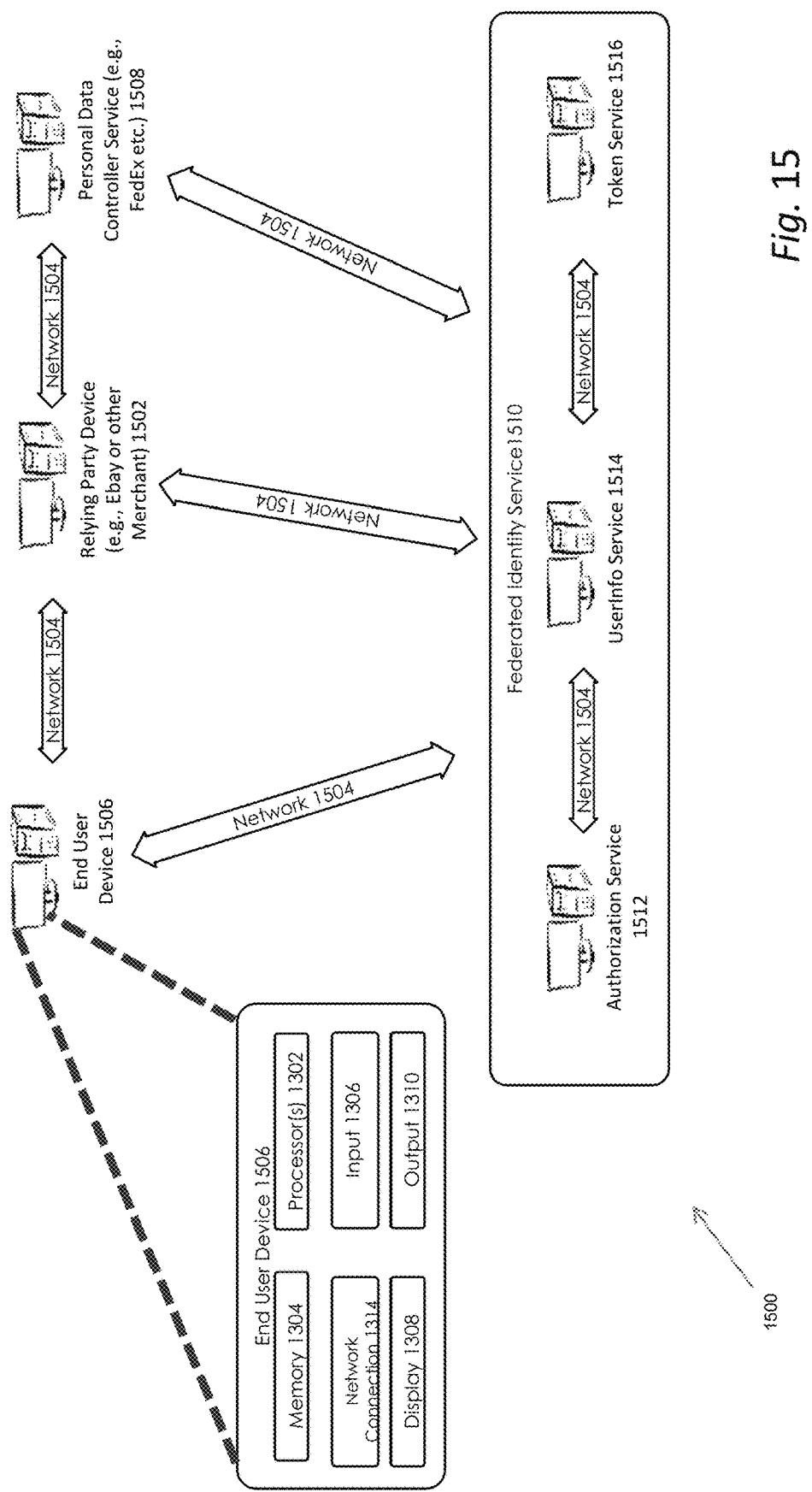
FIG. 15 illustrates one embodiment of the disclosed consumer privacy tools.

FIG. 15—Overview of the Consumer Privacy Tools 1500 in FIG. 15 illustrates an example of the services and devices that may be used with the disclosed tools. End user computing device 1506 may be used by a consumer or other end user wishing to protect the use of her personal data. It may be any type of computing device such as a personal computer e.g., laptop, desktop, smart TV laptop, mobile device, smart phone, wearable, IoT (i.e., Internet of Things device, e.g. NEST™, iBeacon™ or Amazon ECHO™) etc. The components 1304, 1302, 1314, 1306, 1308 and 1310 of the end user computing device provide functionality as described in other sections of this document. The devices and services illustrated may communicate via network 1504.

The relying party device 1502 may be a computing device such as a server or computing process (e.g., an APR application on a mobile device) of a party that does not have access to the end user's personal data but requests a task to be performed with the end user's personal data. An end user may interact with a relying party in this disclosure in a situation in which the end user requests to buy goods or services from a relying party such as a merchant (e.g., eBay®). However, according to the process of this disclosure the end user does not disclose her personal data to eBay.

As introduced above with the disclosed tools, the relying party can cause/initiate a task to be performed such as shipping the goods to the end user without the end user disclosing her personal information to the relying party. Execution of the task with the user's personal information is done by a task provider such as a personal data controller service 1508 (e.g., FedEx®) at the request of the relying party. The task provider may require the end user to authorize the task as well as give permission to use the end user's particular personal information required to perform the task. Here, the task provider, FedEx may execute the task using the end user's personal data e.g., such as delivering the goods she bought from eBay to the end user's physical street address. For clarity, in this embodiment, the task provider, such as FedEx, would have previously obtained the end user's personal data (physical street address) e.g., via the end user previously creating an account with FedEx and providing her personal information.

Authorizing, validating authorizations and other functions performed on/with the end user's personal data may be done with the aid of a federated identity service 1510 or other similar service. In one embodiment, the federated identity service is comprised of 1) an authorization service 1512 used to obtain end user authorization of the task and to continue to validate that the end user and/or other services still authorize the relying party's requested execution of the end user authorized task with her personal data; 2) a userinfo service 1514, which provides additional information beyond authorization, identification and/or authentication and aides in the communication between the authorization service 1512 with the personal data controller service 1508 and token service 1516; and 3) a token service 1516 to aid in creating tokens used in the end user personal data/task authorization process.

In this illustrated embodiment, the federated identity service 1510 is installed on a single server e.g., the authorization service 1512, userinfo service 1514 and the token service 1516 are all installed on the same server. In other embodiments, the personal data controller service 1508 may be installed on the same server as the federated identity service. In other embodiments, any combination of these can be installed on one or more different servers.

Personal data controller service 1508 may be a party such as FedEx in which the end user has previously established an account and previously provided her personal information e.g., her email, physical address, phone number or any other data such as pictures, movies, texts etc. As seen in the embodiment below, the personal data controller service 1508 is configured to require end user authorization to execute task(s) associated to her personal data and to only execute said tasks if requested by an end user authorized relying party. In addition, the personal data controller service may also require that the end user explicitly authorize it to execute the task if the aforementioned conditions/parameters are also true.

Said end user authorization may be created and validated by the federated identity service in which a preconfigured relationship (discussed below) would be previously formed between the federated identity service, the end user device, the personal data controller service and the relying party or any combination of these. In this manner, various tokens, the various authorizations, validations and the associated relying party requests, personal information, profile IDs, specific tasks, conditions/parameters or references to these etc., may be shared between the above devices and services in FIG. 15. A preconfigured relationship can be via previous authorizations by various protocols like OAuth between these devices and services and will be discussed more below.

Figure 16:
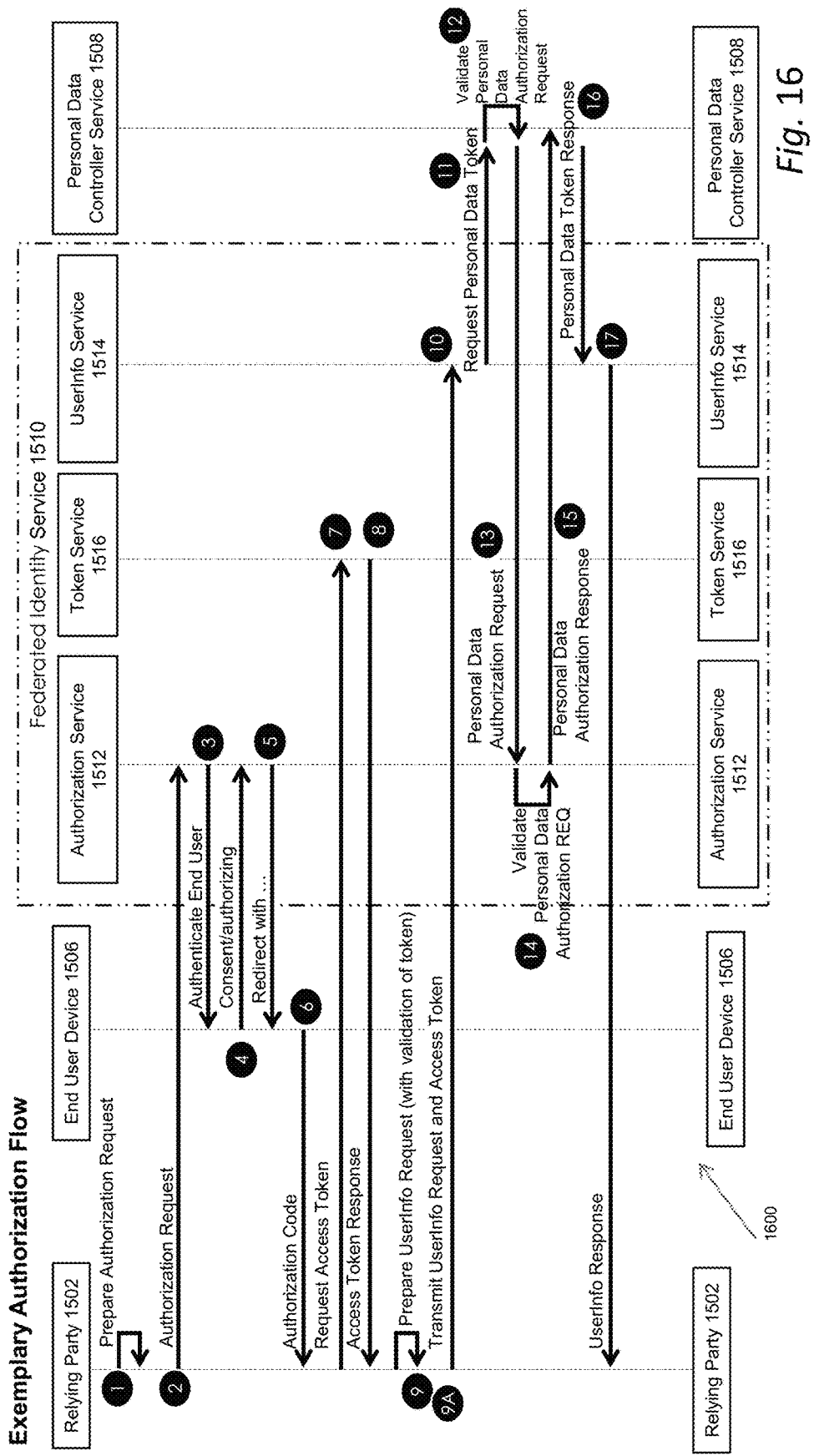
FIG. 16 illustrates one embodiment of an authorization flow for the disclosed consumer privacy tools.
Figure 17:
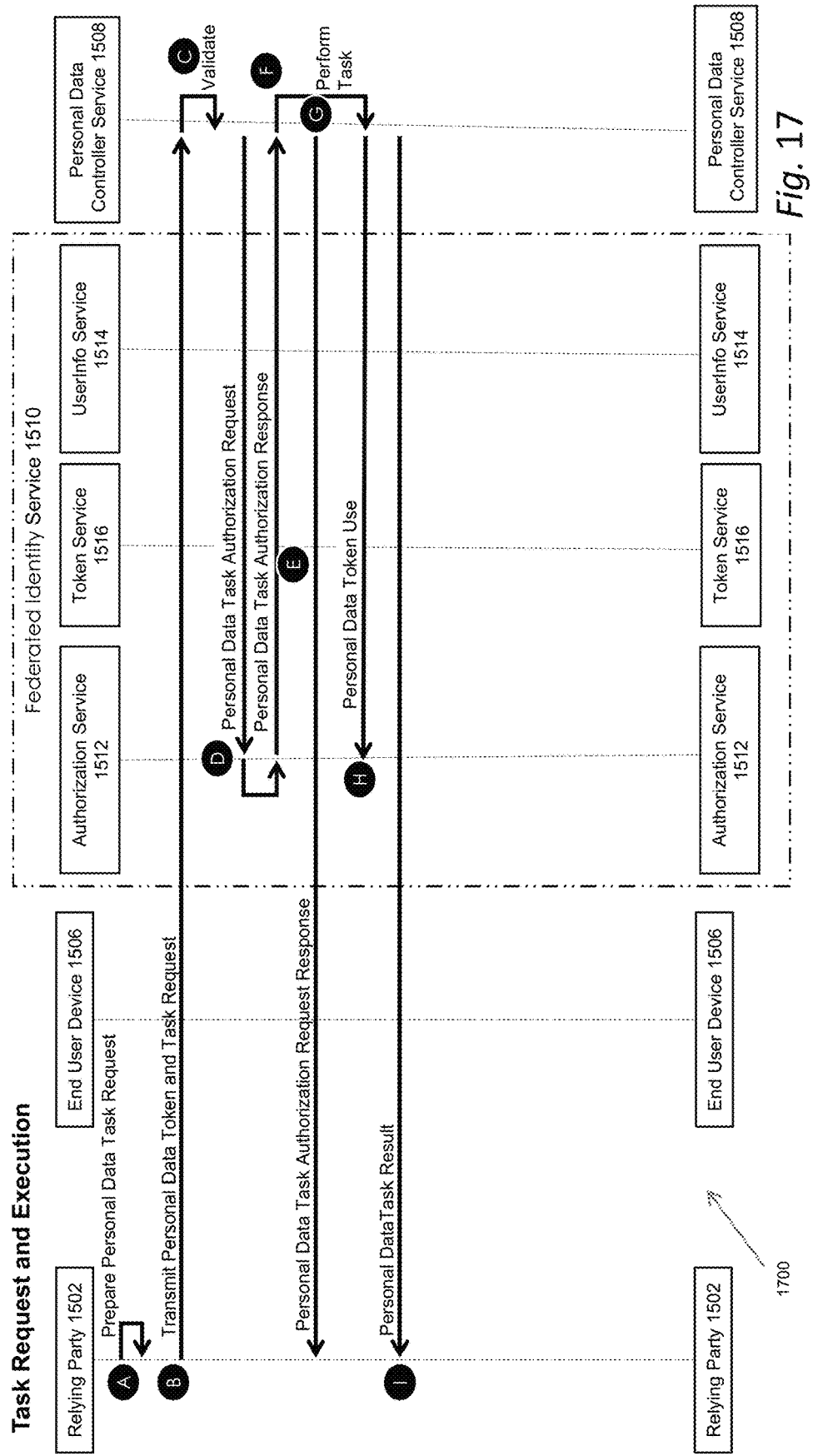
FIG. 17 illustrates one embodiment of a task request and execution of the disclosed consumer privacy tools.

Overview of FIGS. 16-17

Below is a brief overview of the embodiments illustrated in FIGS. 16-17. An in-depth explanation of each figure follows.

Obtaining End User Task Authorization (FIG. 16, steps 1-9)

Steps 1-9 illustrate the steps in which the end user with the assistance of the federated identity service, authorizes the relying party to request the execution of a task using her personal data. This authorization may be contingent upon receiving a request to execute said task from a relying party that the end user authorizes. The authorization may also require that the task be executed by an end user authorized personal data controller service. Said request may be configured to be sent from the relying party to a personal data controller service, as seen below, that serves as a task provider and executes the task if the authorizations are valid. This is seen in FIG. 17. The above may be via OAuth, OpenID and/or other similar technologies.

Involving the Personal Data Controller Service in the Process: Relying Party Asserting to the Personal Data Controller Service That it Has End User's Authorization to Execute the Task (FIG. 16, steps 10-17)

Steps 10-17 illustrate the steps in which the relying party asserts it has the end user's authorization to request the execution of the aforementioned task. Specifically, these steps involve the personal data controller service receiving data based off the end user's authorization to execute a task with her personal data. Said authorization also comprising end user authorization for the personal data controller service to execute the task at the request of the relying party. The personal data controller service may then further evaluate feasibility of the task being executed and that the authorization(s) are still valid via the federated identity service. If the authorization and feasibility are validated, then the personal data controller service may cause a userinfo response (optionally comprised of a personal data token) to be transmitted to the relying party. This userinfo response/personal data token serves as a key for authorization of the task and may also serve to request execution of the task by the personal data controller service.

The Relying Party Requesting Task Execution and Execution by the Personal Data Controller Service (FIG. 17, steps A-I)

Steps A-I illustrate the relying party requesting task execution by transmitting data based on, or related to, the userinfo response/personal data token previously transmitted from the relying party to the personal data controller service. This may serve both as a trigger and/or authorization to execute the aforementioned task using end user personal data. In other embodiments, the userinfo response/personal data token or related data may not be a trigger and just serve as authorization bar the personal data controller service to execute the task using end user personal data. For instance, in one embodiment, the relying party may send a separate trigger and the personal data controller service may send back a token request and the relying party replies with sending the personal data token or related data to serve as authorization. The personal data controller service may again determine feasibility and again validate that authorization is still valid as well as validate any required conditions/parameters before causing the execution of the task using the end user's personal data.

Introduction to An Exemplary Authorization Flow (FIG. 16)

1600 in FIG. 16 illustrates an exemplary use of the disclosed tools. Specifically, illustrated is an end user who is buying goods from a relying party. The user exerts control over the use of her personal data during the buying of the goods and the task of delivering goods to her. As introduced above, this control may comprise the end user authorizing a task provider to use her personal data to perform a task such as delivering her goods to her physical address. Additionally, the end user may require that for the task provider to perform the task, the request for task performance be made from a particular relying party.

The execution of the task with her personal data above, may be performed without revealing her personal data to said relying party, in the described embodiment, this is accomplished with the aid of a federated identity service and task provider (personal data controller service), the latter of which may possess her personal data and executes the task using her personal information upon her authorization(s). Thus, this embodiment does not require that the relying party have access to her personal data. In one embodiment shown in FIG. 16, the OAuth protocol is modified to accomplish the above, although any other suitable protocol could be adapted in a similar manner. Any of the embodiments disclosed herein may use preconfigured relationships between the illustrated services and devices as discussed below.

In one embodiment, in preparation for step 1, an end user may first transmit an indication to the relying party device that she desires to use the disclosed tools. This may be in response to a relying party indicating to the end user that the disclosed tools are available to help perform the task. Specifically, the end user may request to have a task performed with her personal data but without disclosure of her personal information to the relying party.

As such, the relying party device determines, based on the end user's indications or is otherwise configured to request the end user for authorization, to use her personal data for a task. Thus, given that the end user does not wish to give her personal information for the task to the relying party, she may instead elect to have a trusted task provider (e.g., personal data controller service) execute the task with her personal information. In this example, the task may be to ship the good she purchased to her home address. In other examples discussed below, the task may be to have the task provider initiate a voice call using her personal information, publically display her first name, deliver email or other data to herself or others using her personal information or that of other users associated to her account on the personal data controller service etc.

The task provider may not only require end user authorization to execute the task requested by the end user, but also may be instructed with other conditions/parameters required for execution of the task. Specifically, the task provider may receive instructions (e.g., from the end user or other device or other services/devices) and/or be initially configured via the preconfigured relationship to require that not only the end user authorize the task to execute with particular authorized personal information, but the request to execute the task must be from a relying, party that the end user has authorized to request execution. In addition, the end user may also allow only certain personal data controller services to execute the above task. Finally, the end user may also only authorize task execution under certain conditions/parameters such as during certain time windows for execution etc. In one embodiment, the end user may place additional restrictions on the use of her personal data such as specifying additional conditions and parameters that the task provider will then be configured to follow.

The relying party and the personal data controller services and other illustrated devices and services would typically be preconfigured to offer the user the options of the above and to enforce/abide by the above requirements (e.g., end user request for authorizations).

In the manner above, the end user can interact with a plurality of merchants in which they act as relying parties. But the end user only need reveal her personal information to a single personal data controller service or at least a very limited number personal data controller services instead of each relying party that needs her personal data to perform a task for her. This limits the number of devices that are needed to store her personal information which enhances privacy and thus reduces need for the user to reenter her personal information with each merchant.

End User Authentication and the Federated Identity Service (FIG 16. Continued)

At step 1, the relying party prepares an authorization request to ask the user to authenticate herself as well as an authorization to request that a personal data controller service perform the task. Specifically, the relying party creates a message that is sent to the end user that requests an authentication and authorization request. This request may be based on which tasks and associated personal data need end user authorization in order to be executed. For example, if an end user requests that goods she purchases from the relying party be shipped to her physical address, a personal information data requirement such as a physical address data requirement may be generated by the relying party and associated to a task to be completed, (i.e., to ship a package to her address).

However, if the relying party checks its local or associated memory that it does not have the personal data (e.g., the required data) needed to perform the task or is otherwise requested to use the disclosed tools, the relying, party device is configured to generate a message to request execution of the task via a task provider that may have the personal data such as the personal data controller service.

This authorization consent for the above task and use of the personal data for the task will be obtained via an authorization request sent to the end user. This may comprise a record of what end user personal data is being requested and for which specific task(s). In addition, the end user may only authorize that the use of her personal information for a given task may be executed by a particular personal data controller service she selects. In one embodiment, the relying party can determine which specific personal data controller services have the required information (e.g., via the preconfigured relationship) for a specific end user and request end user authorization to execute the step via the applicable personal data controller service. More specifically, the relying party may query various personal data controller services about the end user using an identifier associated to the end user (e.g., logins) and determine which personal data controller service has applicable personal information about her. The personal data controller services may respond to this query if they do have the relevant information without transmitting/revealing the personal information. The relying party may then display to the end user the personal data controller services that have personal information and permit end user selection of which of the personal data controller services the user wants to proceed with. Alternately, the end user may select a personal data controller service to which below, she will authenticate and provide relevant authorizations.

In addition, the authorization the end user grants may be conditioned upon the identity of a relying party that is requesting to execute the particular task. For instance, the user may only grant task execution authorization to FedEx if eBay requests execution. Various other conditions/parameters may also be presented to the end user. The user may select and approve/consent to the desired authorizations that are presented or she may specify them. The personal data controller service and/or other devices and services may be preconfigured to abide by the authorizations and requests from the end user e.g., execute tasks with end user personal data only upon correct/valid user authorizations.

At step 2, the authorization request is transmitted from the relying party 1502 to the authorization service 1512. This may be driven by the particular protocol used in the embodiment e.g., OAuth or the preconfigured relationship etc. In addition to the information in step 1, the authorization request may comprise requests for one or more of the relying party's ID/contact information and secret key for encryption, a reference to the identity of the particular end user/profile ID or the user transaction at issue, end user device contact information, the a request for the end user personal data and associated task and associated task execution conditions/parameters, the required or preferred identities) of the data controlling party, if the relying party is required to make the request, etc. As seen in the step below, this desired information in the authorization request or associated to the authorization request may enable the authorization service to communicate with the end user to ask the end user for authorization to use her personal data. The above information may be shared between the relying party and authorization service via a preconfigured relationship that was previously established e.g., an agreement to share information about enabling the tools disclosed herein etc.

At step 3, the authorization service, may in turn, record the information received in the authorization request or information it otherwise received from the relying party. In response to receiving the authorization request, the authorization service may initiate communication to the end user device such as via her web browser or other messaging format (e.g., email, SMS or the like) to obtain her authentication in order for the above authorization(s) to be asked/consent by the end user. This may be via the preconfigured relationship. In one embodiment, this authentication may done via. OpenID protocols, using passwords or other similar tools.

For instance in step 3, the authentication service 1510 may conditionally return a webpage to an end user's device (e.g., via her web browser or mobile application) requesting authentication of her identity. The web page may ask the user to sign-in via a user name and password, biometrics, facial recognition, etc. Once authenticated, the user may be presented with the various authorizations, conditions/parameters for the tasks from the authorization request. Specifically, the end user may be presented with information such as what they are authorizing (e.g., the task and associated personal information that is being requested by the relying party, conditions/parameters etc) e.g., authorization for FedEx to use her physical address information to ship her the good she bought from the merchant.

The Preconfigured Relationship Between Devices/Services

Throughout the tools and embodiments disclosed, the authorization service as well as the relying party, end user device and/or the personal data controller service can be previously configured in a preconfigured relationship to optionally share and/or communicate data such as end user personal data, commands, API instructions, business contractual agreements with the associated requirements and procedures, security tokens and related data between the various illustrated services and devices. This may help facilitate the disclosed steps such as aide in facilitating communication between the illustrated device and services as well as aide in using tokens and data that is communicated between them. For instance, in one example, as the various token(s) are received at various services and devices in FIGS. 15-17, the tokens may be used as secure transaction identifiers. This may be facilitated with a preconfigured relationship (which is not illustrated) between the illustrated devices and services. Specifically, tokens and other data can be used to refer to particular portions of data that any of these services/devices received from the preconfigured relationship with the other services/devices e.g., a token may be associated to a user, a transaction number, personal data, associated tasks, conditions/parameters or any other data etc.

In addition, in one example, the preconfigured relationship between eBay (the relying party) and FedEx (personal data controller service) may exchange data (ideally only certain data) associated to a token between them such as user transactions and task authorizations between eBay and FedEx. Data such as tokens exchanged between these parties as well as the end user device and federated identity server may have data associated to the tokens that are exchanged or partially exchanged between any of the illustrate devices and services.

However, different devices/services that receive a given token may have access to different associated data as opposed to another device/service. For instance, the federated identity service and/or the relying party may be able to associate a token or data based off a token to a user transaction but not a physical address like the personal data controller service may be able to. In one embodiment, there is no personal data shared between the personal data controller service, the relying party and the federated identity service. In another embodiment, not only tokens but also any of the data featured in FIGS. 16-17 such as access token requests, authorization codes, authorization requests, userinfo requests, personal data authorization request/responses, personal data token responses, userinfo responses, personal data task requests, personal data task authorization request/responses, etc. can all be used to share data or even be shared between the illustrated devices and services via the preconfigured relationship.

In one embodiment, the reassocaiting/remapping associates information to the token via the preconfigured relationship aides a receiving party in deciding what service or action to take upon receipt of the token.

In another embodiment, the tokens or data used as an identifier may be used as a common reference between services. This may link a database on each service or device that has the same token but may not necessarily allow each other access to each other's database. For instance, a relying party and personal data controller service may each have a database with a common token "12345". The relying party may have the token "12345" associated to an invoice, amount paid, SKU number, shipper(s), task, personal data needed for the task, authorizations, conditions/parameters etc. While the personal data controller service may have a database with the token "12345" associated to the user's personal information such as name, street, city, Zip Code etc. Above, the relying party and personal data controller service database may have the token as a common identifier and may use it to provide the disclosed tools but the relying party and personal data controller service database may not necessarily exchange certain information (such as personal information) to each other besides the token value of "12345" to accomplish the goal of the disclosed tools.

Creating An End User Authorization For the Task and the Federated Identity Service At step 4, the end user may then provide consent/authorization to some or all of the displayed authorization requests. In one embodiment, this may be via OAuth. In another embodiment using a mobile device, such as an iPhone®, a relying party mobile application requests a mobile web browser to open a page to the federated identity service. Once the federated identity service has completed the authentication of the end user, the desired authorizations of the tasks/personal data can be asked of the user. For instance, the web page sends a preconfigured URL or other identifier to the relying party's mobile application installed on the end user device. The URL is configured cause the end user to receive request for the relevant end user authorization for the task and personal data.

In yet another embodiment using a mobile device, a relying party mobile application can request another application installed on the same mobile device such as a federated identity service application to open by passing a URL to the federated identity service application. The federated identity service application may be associated with the information needed for an authorization request to the end user in which authorization can be displayed and entered by the end user. Then the federated identity service application can send a preconfigured URL to the relying party application, which returns the end user to the relying party application (or the URL can send the user's web browser or the like to the mobile web browser to a specific page on the relying party's website) to continue the transaction after authorization is obtained.

In one embodiment, the end user can be presented with authorization requests for the task(s) in which she may select from several check boxes or other selection tools that authorize certain types of personal information to be used by the personal data controller service and associated tasks and conditions/parameters for the task at issue and other authorization options the end user may have as introduced above such as which personal data controller service and relying parties are authorized by the end user.

For instance, this display request could be via checkboxes next to identifiers for each piece of requested personal data and associated tasks such as first name, address, permission to cause voice calls to the end user for 30 days, one time use only, which data personal data controller services are authorized to execute the task, which relying party needs to request this of one or more personal data controller services, the specific tasks such as ship to, delivery, call, send email, send SMS, send photo, send data, display data privately or publically etc. The results entered by the end user are then transmitted to the authorization service at step 4.

At step 5, the authorization service then generates an authorization code associated with the specific authorization(s) and associated conditions/parameters granted by the end user above as well as any other desired data. Also associated with the authorization code may be the associated relying party, associated personal data controller services, a reference to the identity of the user, user profile, transaction ID etc.

In one embodiment, the authorization service responds back to the end user's browser/device 1506. Specifically, in one embodiment, in response to the creation of the authorization code, the authorization service returns a redirect address and/or other data associated with the authorization code to the end user's computing device. For instance, a URL for a webpage is returned to the end user's web browser/device and the browser opens the web page as directed by the authorization service in which the authorization code is transmitted to the relying party. In addition to the authorization code being created by the authorization service associated to the above authorization request, the identity/contact details/electronic address of the federated identity service such as the token service 1516 or other services may be sent to the end user for later use as seen below in step 6.

At step 5, the end user's device/web browser builds a transmission to the relying party based on the data received from the authorization service for the redirect of this information to the relying party. The end user device may be preconfigured or instructed by the authorization service or relying, party to execute this step.

At step 6, the web browser on the end user device then forwards the transmission which may comprise the authorization code and optionally other information the end user received from the authorization service. In addition, a secret key (for encryption purposes) may be sent to the relying party as well as an identifier to identify the information sent in this step so the replying party can associate it with the authorization request sent in step 2 (e.g., end user login etc.). Said association between the illustrated services and devices may be done via the above introduced preconfigured relationship.

In turn, the relying party receives some or all of the above data via the redirect and/or via the preconfigured relationship. From the above received data via the preconfigured relationship or other tools, the relying party may associate the received authorization code to the authorization request, the end user e.g., and end user identifier, the federated identity service (the token service 1516 to be used below etc.), a particular end user transaction (e.g., the user's purchase order for the goods) etc. This is useful so that the relying party can map of the associations of received data to that of the authorization requests it sent out in step 2.

At step 7, in response to receiving the authorization code, the relying party requests an access token. Specifically, the relying party transmits an access token request comprising the relying party's ID, secret key and/or authorization code to the token service 1516 as optionally instructed by the instructions sent in step 6 (or it may be preconfigured to do so). The access token request can also be triggered by any variety of needs such as the relying party desiring for task execution or any other demand etc.

At step 8, in response to the above, the token service 1516 creates the access token and transmits it to the relying party in an access token response. This may comprise the token service associating the access token request to the specific user transaction, desired task and personal information that the end user authorized etc. Creation of the access token response may be contingent upon verification of the authorization that the relying party has to request the access token for the particular end user/end user transaction etc., is still valid. The associations that may be used for this validation may be between the access token request and the end user authorized data and associated task as well as its conditions/parameters, a reference to an identity of the end user, profile, the particular transaction, the particular access token request, transaction ID etc. The access token response may be comprised of an access token. Said access token may be created and then associated to the above authorizations and related data via the preconfigured relationship. Thus, the access token may serve as a secure identifier and associated to any of the desired data above.

In one embodiment, in addition to the information transmitted to the relying party above, transmission can include the identity of or a reference to, a userinfo service 1514 to send the access token to when the personal data is desired to be used by the relying party as seen below. In another embodiment, the identity of the userinfo service may be determined by the preconfigured relationship.

In an optional step, before the token service 1516 sends the access token to the relying party, it may request the authorization service to validate if the relying party is still among those parties authorized by the end user or other services to request the user's personal data be used for the associated task authorized by the user in step 4. For instance, in the meantime after step 4, the particular relying party may have had its authorization revoked. Once the relying party authorization is validated the authentication service, the token service responds with the access token and optionally the other information as described above. In one embodiment, the access token may be similar to an OAuth token. Additional Authorization(s) and the Introduction of the Personal Data Controller Service After the above steps, the relying party may ultimately wish to obtain a userinfo response (see step 17 in FIG. 16), which may be used by the relying party to authorize and/or trigger the execution of the user authorized task using end user personal information. For this reason, the steps below will introduce the involvement of a task provider such as the personal data controller service 1508, which may use the userinfo response as authorization to execute the task or otherwise cause/initiate the task to be executed. Specifically, this interaction will serve to directly involve the personal data controller service in the authorization and tokenization process (e.g., that happens on the federated identity service) with the relying party which will allow the personal data controller service to recognize that the relying party has valid authorizations to request it to execute tasks associated to the end user personal information.

As above, the userinfo response may serve as authorization and/or a trigger to cause the personal data controller service to execute the end user authorized task with the end user personal information, Additionally, there may be steps as seen in FIG. 16-17 to add validations of end user authorization and validations that the task can be performed as required/authorized by the end user and/or other devices/ services.

The userinfo response may be directly transmitted from the relying party to, the personal data controller service. The following are the steps that may lead to this step in FIG. 16. Then in FIG. 17, there will be a discussion of how the userinfo response is used to authorize and/or trigger the task. In light of the above, the federated identity service will be introduced after step 9.

Continuing in FIG. 16, at step 9, the access token is optionally validated and a userinfo request is prepared by the relying party. Said validation may comprise determining if the end user authorizations granted above in step 4 to the tasks and personal data are still adequate to complete the task the relying party desires to have the task provider execute e.g., verify that FedEx still delivers to the particular physical address and/or determines if the physical address is still valid and other authorizations obtained in step 4 are still sufficient to execute the task the relying party wishes to have executed by the personal data controller service. In addition, there may also be validation that the personal data controller service still offers the ability to perform the task e.g., still delivers packages, delivers data etc. In one embodiment, this verification to FedEx or other personal data controller service may be via an API communication, which was previously established between FedEx and the relying party.

In addition, validation may include or may be dependent upon the relying party confirming if it still desires to use the particular personal data controller service/task provider that was authorized by the user in step 4 to execute the task with the end user personal data. For instance, the personal data controller service and the relying party may have recently terminated their business relationship or certain parts of it. The relying party may change the selected personal data controller service depending on the validation(s) and/or its desires. Typically, the end user should be asked for authorization if the changes above have not been previously authorized by the end user.

Also at step 9, the relying party prepares a userinfo request after executing the optional validations discussed above. The userinfo request may comprise or be associated to the access token, a reference to the particular end user transaction, the end user tasks/personal data/conditions/ 'parameters, a reference to the particular access token request, a reference to the particular authorization code, a reference to the identity of the end user, a reference to the identity of the relying party, a reference to the identity of the selected personal data controller service etc. In one embodiment, the access token may serve as the userinfo request. The associations above as well as any of those discussed herein may be communicated between the different services and devices in the figure by the above mentioned preconfigured relationship.

In one embodiment, the userinfo request may be built to include any information such as any desired command or request and associated information. For instance, the userinfo request may be used to request the userinfo service to request a personal data token front the one of the end user authorized personal data controller services (e.g., from step 4, FIG. 16). To this end, in the userinfo request may comprise a vendor code such as a code for the authorized personal data controller service. This may assist the userinfo service in routing the personal data token request to the relevant and authorized personal data controller service via the preconfigured relationship.

At step 9A, the userinfo request and/or access token (and optionally any of the above Information) is transmitted to the userinfo service 1514 as directed by the access token or information associated to it which was received in step 8 above. Alternately, the relying party could be preconfigured to send the above data to the userinfo service or information from the preconfigured relationship at anytime the relying party desires.

At step 10, the above data is received by the userinfo service. In addition, userinfo service may have associated the user task and personal data authorized or other data above to this received data via the preconfigured relationship. In step 11, a request for a personal data token is created e.g., in response to the userinfo service 1514 being able to associate the received data to the authorized task/personal data etc., and determine that via the preconfigured relationship, that requesting the personal data token is appropriate. In turn, these are associated to the personal data token request. As illustrated, this step may allow the userinfo service to aide in validating which personal data/tasks requested by the relying party in the userinfo request are still valid/eligible to perform/give using the end user's personal data. This may be through communication with the authorization service via the personal data controller service and the preconfigured relationship(s) as discussed below.

To accomplish this validation, the userinfo service transmits a request for a personal data token and/or any associated data, such as the access token it received in step 10, to a personal data controller service for confirmation that the end user and/or other services still authorize the particular userinfo request from the relying party. In one embodiment, the userinfo service may be preconfigured to execute this step. In another embodiment, the userinfo request and access token can either explicitly instruct which personal data controller service is to receive the personal data token, or the userinfo request and access token can be used via the preconfigured relationship by the userinfo service to associate the personal data token to the personal data controller service the end user authorized.

At step 12, the request for the personal data token is received by the personal data controller service. This request may be based on the userinfo request and/or access token and may be comprised of the access token with a command. This request for the personal data token is recognized by the personal data controller service (e.g., via preconfigured API (Application Program Interface) etc.) as a personal data authorization request associated to particular end user personal information and associated task and other conditions/ parameters the user previously authorized above. Once recognized, the personal data controller service is configured to start the process to execute optional validation of the personal data authorization request with the authorization service 1512. This validates that the above authorized task that uses the end user's personal data (e.g., the same task and personal data requested via the userinfo request and/or access token) is still authorized. Again, these steps such as communicating and associating received tokens, personal data token requests etc., to the above tasks and related data may be facilitated via the above-mentioned preconfigured relationship between the illustrated services and devices.

At step 13, a request for the personal data authorization request is transmitted to the authorization service for validation. Specifically, the personal data controller service may build and submit a request to the authorization service for validation that the end user personal data at issue (e.g., personal data associated to the request for personal data token, userinfo request, access code and/or other data) is still authorized to be used by the relying party in the manner it was authorized by the end user and/or the other services as discussed above. This step may include the inclusion of instructions to transmit the validation result back to the personal data controller service.

At step 14, a validation of the personal data authorization request is executed by the authorization service and a personal data authorization response may be created. Specifically, the authorization service may associate the personal data authorization request, userinfo request and/or access token or related information to the specific authorization(s) given in step 4 by the end user and/or to any other authorizations granted regarding the authorized task and personal data. This association may be a record of the particular end user authorization such as that made in step 4 on the authorization service. This may be done via the rules established in the preconfigured relationship.

At step 15, a personal data authorization response is created and transmitted to the personal data controller service. Specifically, once the personal data authorization request (or parts of the request) is validated (e.g., confirmed) as still authorized, the authorization service may then transmit a personal data authorization response indicating (e.g., confirming) the task(s) and personal data associated to the personal data authorization request that is still authorized tor the personal data controller service to execute as well as with validation of the optional parameters and conditions such as the required identity of the relying party that must make the task request etc. This is transmitted with any desired associated data (e.g., reference to the personal data token/ personal data authorization request/user/user transaction/ reference to the userinfo request/reference to the access token etc.) to the personal data controller service 1508. In addition, to help facilitate this sharing of information associated to the token and the various requests and responses, the above mentioned rules established with the preconfigured relationship can yet again be used in the background between the federated identity service and personal data controller service.

At step 16, the personal data authorization request is received at the personal data controller service and a personal data token response is created in response to this. The personal data token response is then transmitted to the userinfo service. Specifically, the personal data controller service may build a personal data token response and associate it with the authorized tasks, associated personal data, the identity of the applicable personal data controller services and associated conditions/parameters which are still authorized based on the current status of authorizations recorded on authorization service 1512 and validated in the previous steps. In one embodiment, the personal data token response comprises a personal data token. The userinfo service may receive and store the personal data token as well as optionally the associate some or all of the information used in the steps above via the preconfigured relationship or other tools.

At step 17, in response to receipt of the personal data authorization response above which confirms validation of the personal data authorization request, a userinfo response is created based off of, or comprising, the personal data token response and transmitted to the relying party. The userinfo response will be used when the relying party wishes to cause the personal data controller service to execute the authorized task with the authorized personal data.

The userinfo service may send a response back to the relying party comprising the personal data token and other required data needed to authorize and/or trigger a request to the personal data service to execute the authorized task using end user personal data. To this end, a userinfo response is sent to the retying party, which may comprise the personal data token response/personal data token etc. The userinfo response is sent and received by the relying party in a manner such that the relying party can associate the received the userinfo response to the authorized task, personal data, conditions parameters or other related data such as via the preconfigured relationship. This is useful so when the relying party wishes to cause execution of the authorized task, it may use the received userinfo response it received from the above steps. The userinfo response can be associated with any data to help facilitate this such as the access token it transmitted in step 9, the personal data token request, the userinfo request, access token, personal data authorization request/response, personal data token response, transaction ID etc. In one embodiment, the personal data token may serve as the userinfo response.

Relying Party Using the Personal Data Token to Execute the Authorized Task with the End User Personal Data (FIG. 17)

1700 in FIG. 17, will discuss the relying party using the data received by the personal data controller service in FIG. 16 as a task authorization and/or task trigger. Specifically, the information the relying party received in FIG. 16 will be used to authorize and/or execute the task the end user authorized with her personal data. More specifically, this figure will illustrate the authorization for and/or execution of the task associated to the userinfo response from step 17 of FIG. 16 by the personal data controller service 1508. However, before authorization/execution by the personal data controller service occurs in FIG. 17, an optional verification that the task is still authorized may be performed.

In FIG. 17, step A, upon deciding, being requested or being configured to cause the personal data controller service to confirm it has a valid authorization to execute the authorized task with the end user's personal data (e.g., in the example above, to ship the goods the end user purchased), the relying party prepares a personal data task request. As introduced above, in order to ship the goods to the user without the end user's personal data, the relying party merchant will have a task provider, who is in possession of her personal data, perform the task e.g., ship the package to the end user. The relying party may know which particular personal data controller service provider to send a personal data task request to based upon the various associations to the userinfo response it previously received or in a similar manner. For instance, the userinfo response may comprise the personal data token and the vendor code associated to a particular personal data Controller service. This code may be used to help route which particular personal data controller service to transmit the personal data token and task request to in step B of FIG. 17 such as via the preconfigured relationship.

The personal data task request may comprise or refer to, or otherwise be associated to (e.g., via the preconfigured relationship), the userinfo response from step 17 of FIG. 16, the data access token, personal data token, personal data token response, ID of the relying party, a reference to the particular end user personal data, profile of a user and/or particular end user transaction ID, e.g., data to assist in a receiving party to determine what task to execute and associated end user personal data, timing, place and other details/parameters/conditions etc.

In step B, the personal data task request is transmitted to the personal data controller service. In one embodiment, the relying party may have previously received instructions to send the personal data task request to the personal data controller service in any of the previous steps in FIG. 16, or the relying party may be preconfigured as such, or may be requested to transmit to the selected personal data controller service based on an end user request or the results from FIG. 16.

In an optional validation step C, the received data from step B such as the personal data token and/or received personal data task request is associated to the specific end user/task/personal data, conditions/parameters and/or other data discussed in FIG. 16. In this step, the personal data controller service may be requested or preconfigured to validate that the authorization(s) and other associated information in FIG. 16 are still valid. Said validation is illustrated at step D to step E in which the personal data task request and optionally, the related information, is transmitted to the authentication service for validation. This may be facilitated by the above discussed preconfigured relationship between the illustrated services and devices.

The above validation steps may be useful if the end user has since withdrawn the authorization granted in step 4 in FIG. 16 etc. The personal data controller service may lie preconfigured to execute this validation or the personal data task request may contain instructions requiring such. These instructions may have been inserted in FIG. 16 by the end user or the federated identity service or relying party or personal data controller service.

In step D, the above introduced validation continues. Specifically, the personal data token, the userinfo request, received personal data task request and/or data based off any combination of this data, is sent to the authorization service for validation along with a request that the authorization service execute validation. Validation that the personal data task request is still valid may comprise confirming that the end user or other services such as the personal data controller service or federated identity service has not withdrawn the authorizations granted in FIG. 16 in the meantime. Also validated may be that the task comprises use(s) of the end user personal data that is still within the end user consented parameters/conditions and other parameters that the services in FIGS. 16 and 17 may require such that the task be performed by a particular personal data controller service and/or the task be requested by a particular relying party. In other words, validation is executed that the task is still feasible e.g., can still be performed in light of authorizations and other parameters/conditions such as current delivery schedules, data connection(s), logistics etc. The data transmitted to the authorization service may also comprise instructions to send back a personal data task authorization response back to the personal data controller service upon validation e.g., that the personal data task request is still valid and able to be performed. Alternately, the instructions to transmit the personal data task authorization response back to the personal data controller service may be preconfigured in the authorization service.

In step E, the personal data task authorization request response is transmitted back to the personal data controller service upon validation of one or more tasks.

In step F, the personal data task authorization response is received at the personal data controller service. If authorization for at least one of the associated tasks is still valid, then the personal data controller service may be preconfigured to execute the applicable task, If an associated task is not still authorized, then the task is not executed and optionally, any of the devices/services illustrated in FIG. 17 may be notified. Like the above, the personal data controller service may use the preconfigured relationship to identify associated tasks/personal data and her personal data and other related data to the received personal data task authorization response and determine the appropriate action(s).

In step G, the personal data controller service may now perform or cause to be performed/initiate, the end user personal data task(s) in response to receiving the above validation(s) (e.g. confirmation(s)) and optionally if it receives a trigger/execution request from the relying party. This may comprise the personal data controller service remapping the personal data token/task request to determine what the authorized tasks, personal data and other data and then to cause execution of the task. This may include the execution of a task or execution of a task on or relating to a good/service/data has such as the package, a service, data such as email, messages, pictures, SMS such as the above in which a package is delivered using the end user's address.

In an optional step the personal data controller service may transmit a message indicating to the authorization service that the particular personal data token was used to execute the task requested by the relying party in the above steps. The authorization service and/or other service may then record the use. This recording of these personal data token uses may be used to prevent tokens from being used more than a desired number of times which may defined by the end user, federated identity service, personal data controller service etc. For instance, after a personal data token is used once in FIG. 17 or in any other manner, a second use attempt may occur in a similar manner. However, when the personal data token/reference to the personal data token is received. by the authorization service at step D in FIG. 17 for the second time (in attempted second use), the authorization service may associate this data to the record that the personal data token was previously used. If authorization associated to the token is limited to a single use or other limiting parameters/conditions, the authorization may be denied. Such parameters may be specified as desired by the end user or others and may be conveyed to the authorization service via the preconfigured relationship or other tools.

Step I, the result of the execution/attempted execution of the personal data task via the personal data controller service can be optionally transmitted back to the relying party and/or other devise and services. This may comprise an indication of whether the request was successfully executed and the conditions thereof (e.g., time, date, location, % completion, receiving party etc.). If the response of the task execution was not successful, then details of the task execution failure can be transmitted to the relying party or others.

Token Embodiments

Figure 18:
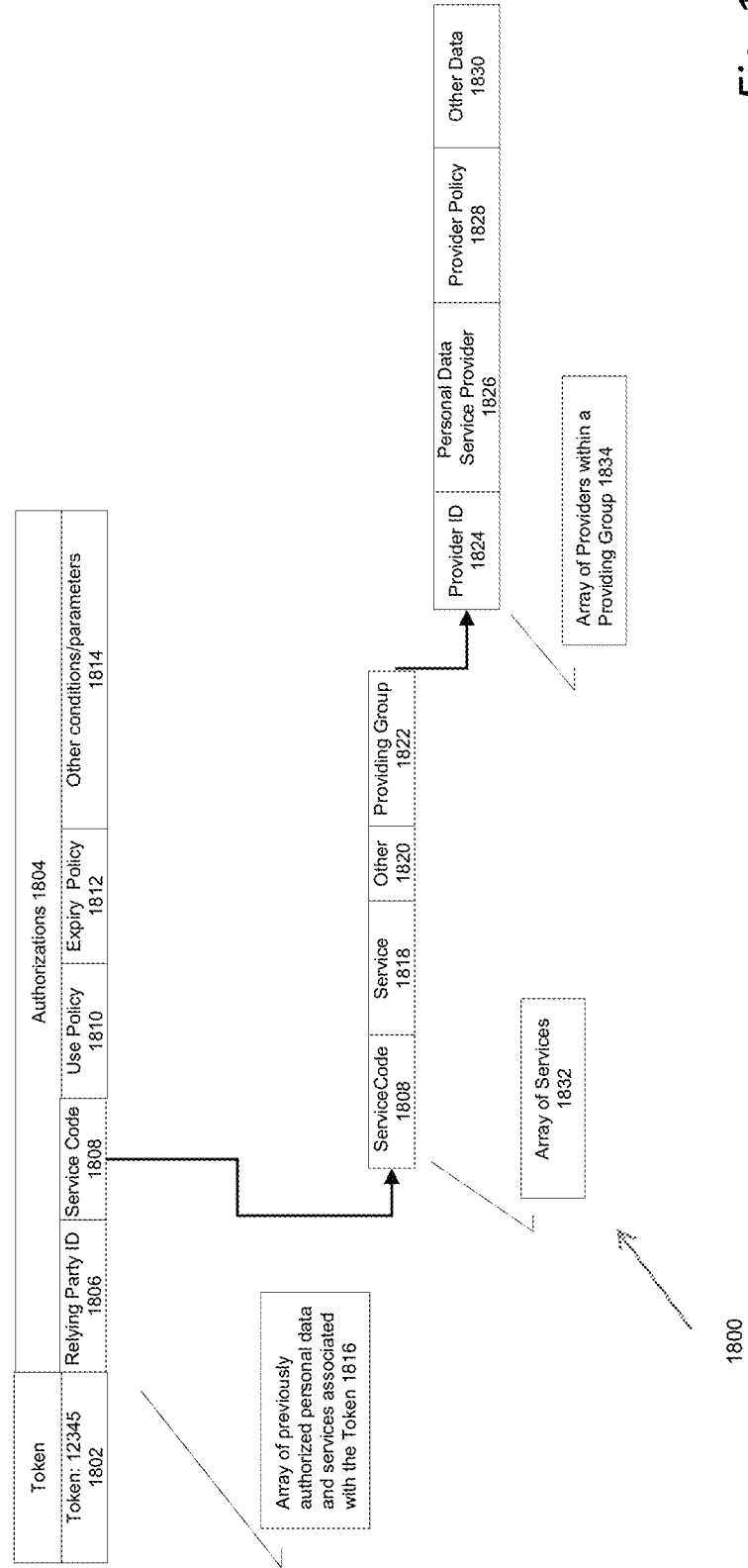
FIG. 18 illustrates one embodiment of a token database model.

The disclosed tools may use a variety of different token embodiments. For instance, 1800 in FIG. 18 illustrates a token data base model using token 1802. As illustrated, the disclosed tokens, such as the access token from step 7 in FIG. 16 and the personal data token in step 16 in FIG. 16, can be associated to data in a similar manner (e.g., use similar database associations). Using such constructions, the data associated with tokens may serve to facilitate the disclosed tools such as to help in conveying information associated to tokens between the illustrated services and devices such as via the preconfigured relationship. Tokens or any identifier may be used in the disclosed embodiments.

As introduced above, tokens serve as a tool to help to securely coordinate/share information between devices and services. Specifically tokens may be used in a manner to convey end user personal data between selected servers/devices. In addition, the data that is associated to a given token between various server/devices may not always be the same. This is accomplished by a database model associated to a given token, the preconfigured relationship or similar tools.

In one embodiment, a token may represent a secure transaction identifier e.g., the purchase above regarding the purchase of goods from eBay and shipped via FedEx. Additionally, the tokens and the preconfigured relationship may help share data in between the federated identity service and the other services/devices about tokens that each may have. However, the information that each of the services/devices has about a particular token may be different.

For instance, eBay and FedEx may have different information associated to the token. As above, FedEx (the personal data controller service) may not share the user's physical address yet share a shipping cost, estimated delivery date, etc. with eBay (the relying party). Via the preconfigured relationship, the various services/devices may communicate or not communicate any desired information using the token as a transaction ID such as a first name, login account, reference numbers etc.

1800 in FIG. 18 illustrates an example of a database model that may be associated to a token 1802, which may be any token e.g., access or personal data token. The token value itself may be created by any tools and may be a GUID or otherwise unique to a given system. As illustrated, the value of the token is "12345" but may have any combination of characters, numerals or other information. The token may be associated via a database model to authorizations 1804 as well as conditions and parameters relevant to task execution(s), personal data, goods/services, user accounts, authorizations, validations, feasibilities, user profiles or any other desired data.

For instance, in previous FIG. 16 at steps 1-4, the end user had authorized the use of her personal information for a task (for shipping goods to her address). The token and associated data base model created via the authorization service at FIG. 16, step 7-8, may have been similar to that illustrated in FIG. 18. Specifically, the authorizations from the end user may include an array such as 1816: an authorized relying party ID 1806 (eBay), a service code 1808 which may represent a particular task to execute with end user personal data as well as optionally an association to the type of end user personal data that is relevant to the particular task, a use policy 1810 which may represent a condition/parameter applicable to the task and associated end user personal data, an expiry policy 1812, which may be a condition/parameter applicable to the task. Additional conditions/parameters 1814 may also be included. Examples of additional conditions/parameters may be a number of shipments, number of voice calls that can be made, how long the relying party can hold the end user first name in their database, time of day another party can call the end user on the voice number, time periods that the task is permitted to be executed etc.

Service code 1808 may be associated to an array of services 1832 comprising: the service 1818 (e.g., the task such as delivery to home address, make a voice call, display first name), other data 1820 and a providing group 1822. Examples of other data 1820 may be a URL to initiate a work flow such as shipping, which may comprise shipping label creation, printing, approval, pick-up, request and delivery tracking etc. The providing group can be associated to an array of providers 1834 comprising: a provider ID 1824 (e.g., FedEx's ID number/vendor number), personal data service provider 1826 (e.g., a personal data controller service name like FedEx), a provider policy 1828 which may comprise conditions/parameters used to execute the task or to execute after the task or to execute if the task is unsuccessful, and other data 1830. Examples of other data 1830 may be the weight of a package, size of a package etc.

Figure 19:
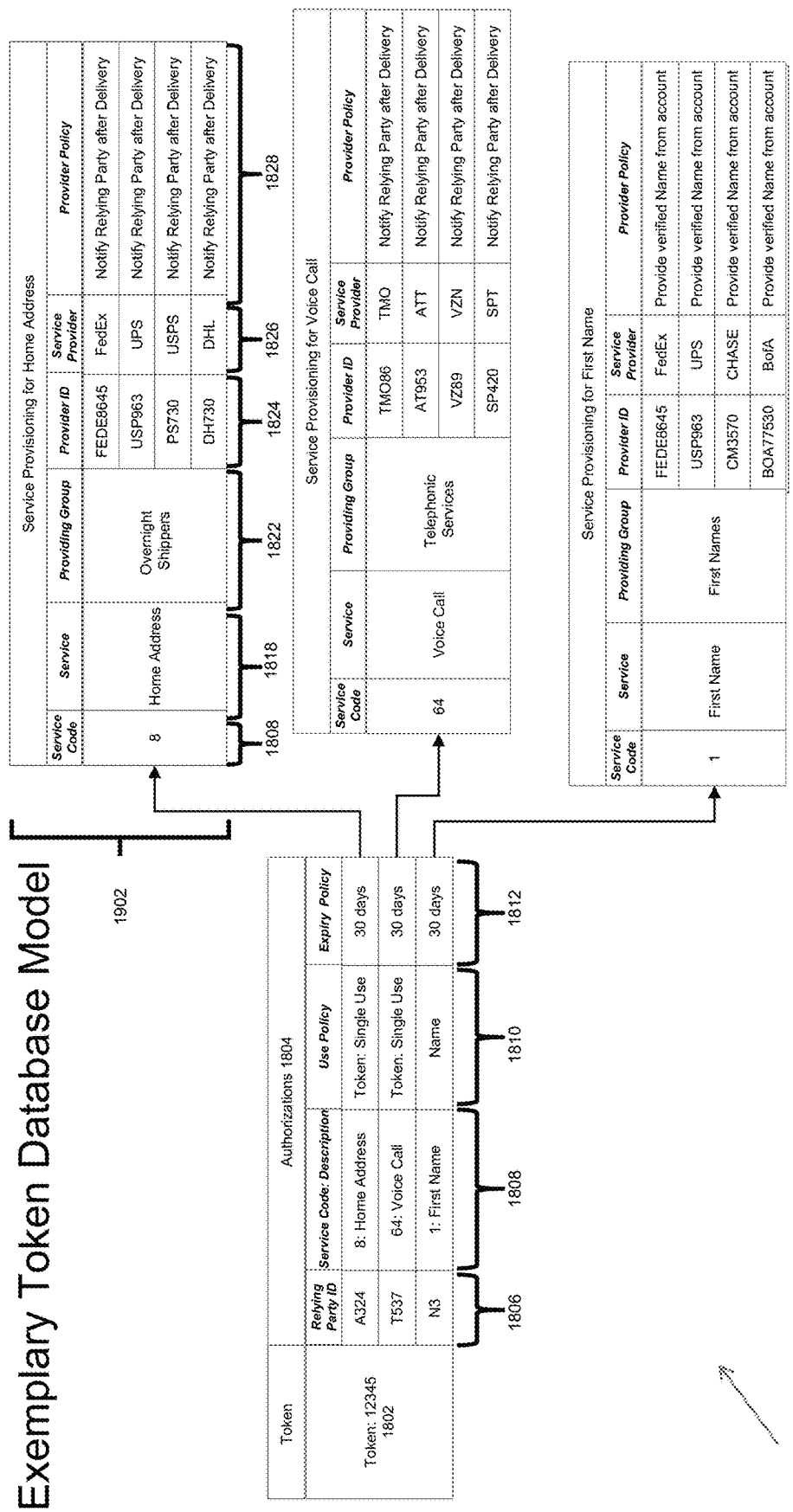
FIG. 19 illustrates another embodiment of a token database model.

Another example of a token database model is in 1900 as illustrated in FIG. 19. Here the single token 1802, which may be associated via a mapping system to an end user, end user transaction, transaction ID etc., (as described above) may also be associated to a plurality of end user tasks (services) and their associated information as seen in the service code(s) and their descriptions 1808. Here, there are service codes/descriptions for the end user tasks which are associated to the single token "12345" which are "8:-Home Address", "64:Voice Call" and "1:First Name" in 1808. Each of these service codes/descriptions corresponds to another illustrated array. For instance, code/descriptions "8:Home Address" is associated to array 1902 etc.

With the above, the steps in FIGS. 16 and 17 for a single token can be associated to several tasks, where each task is one to be performed at different providers/personal data controller services or even at the same providers/personal data controller services. For example, the token 1802 in FIG. 19 can be associated to three different tasks and associated task authorizations in step 4, FIG. 16 that uses her personal data: "8:Home Address", "64:Voice Cali" and "1:First Name". This may include authorization from the end user to execute these tasks through different personal data controller services. For instance, shipping to a physical address may be via FedEx, calling may be via AT&T®, and displaying a first name may be Chase Bank®.

Thus, a single access token can request a plurality of tasks to be executed by a plurality of personal data controller services may be constructed at step 7, FIG. 16. This single request may create a token and associated data as illustrated in FIG. 19 and used to cause the steps 9-17 in FIG. 16 and steps A-I in FIG. 17 (including any optional steps) three separate times because of the three different tasks to be executed by the different personal data control services/providers. In another embodiment, another intermediary could be established that acts like a personal data service broker or aggregator to accomplish the above.

For instance, at step 7 in FIG. 16, the relying party may determine that that the three tasks in FIG. 19 may require services from at least three personal data controller services (e.g., shipper, phone company, and a bank) each of which may need different personal data and different task authorizations for their specific tasks. Thus, in step 7-8 in FIG. 16 either two or more different tokens or one token can be created. In the later case, the single token may be as illustrated as in FIG. 19 on optionally the database of the relying party and/or federated ID service. In step 9, FIG. 16, in this case, the single token could be transmitted to the three different personal data controller services. The three different tasks would be associated to the same token (e.g., via the preconfigured relationship). The particular task associated to the token depends on the type of task the personal data controller service provides. The personal data controller service determines this based on the task that was associated to the token, which was communicated to it via the preconfigured relationship. In addition since the user may have previously created user accounts on each personal data controller service with different personal information, the different tasks may use different personal data. This personal information may be associated to the token and service via the preconfigured relationship or instructions transmitted to the particular personal data controller service. The remaining steps in FIG. 16 may be executed three times as illustrated using different personal data controller services.

In one embodiment using the token in FIG. 19, the same steps authorization/validation in FIGS. 16-17 may riot all occur for the different tasks executed by the different personal data controller services. For instance, if the end user or a service/device in FIG. 16 specified that any of the disclosed authorizations and/or validations in FIGS. 16 and 17 was necessary for shipping to a home address task, but not for the voice call task, then the authorization/validation process between the tasks would differ accordingly.

Also illustrated in FIG. 19, each task (e.g., service) may be associated to a single provider such as a personal data controller service as well as be associated to a plurality of providers such as those within the same provider group that provide the same or similar tasks. For instance, array 1902, the home address task (e.g., "8:Home Address") can be associated to a plurality of different providers/personal data controller services within the same providing group e.g. "overnight shippers". Here, FedEx, UPS®, USPS® and DHL® are all associated to the same providing group. Each providing group may have different policies/conditions/parameters and authorizations to personal data. The plurality of having various providers/personal data controller services within the same providing group for a specific task may serve various purposes. For instance, the authorization given by the user in FIG. 16, step 4 to execute the task may be specific to a particular personal data controller service or to all or some of the members of a providing group. In another embodiment, the conditions/parameters applicable to one personal data controller service may be different than those applicable to another personal data controller service. Thus, a relying party may determine during the illustrated steps in FIG. 16-17 that one particular authorized personal data controller service is currently the best suited (e.g., based on current the availability of services, speed of service, type of service) for task performance based off the applicable conditions/parameters for each personal data controller service.

In one embodiment of FIG. 19, once the authorization given by the user in FIG. 16 the authorization consent message generated at, step 4 is received by the authorization service to all or some of the personal data controller services in FIG. 19. The authorization service may, via the preconfigured relationship, determine which of the personal data controller services that are associated to the task have accounts associated to the user. In addition, the authorization service may examine the accounts at the personal data controller service to determine if they have the required personal information needed for the specific task before or after end user authorization. In an example of the above, the end user authorizes to ship a package using a token associated to an array 1902 with any of a plurality of providers/personal data controller services that ship packages (same provider group). The end user may not need specify which particular provider to use out of the provider group (or may specify an order of preference). In response to receiving the authorization for a plurality of providers, the authorization service communicates via rules established by the preconfigured relationship to each of the authorized providers/personal data controller services and determines if they have an account associated to the user. A request can then be made to each of the providers/personal data controller services to see if the accounts have the personal information needed to execute the task (ship a package). Only the authorized providers/personal data controller services with the necessary personal information may be among those selected to perform the task.

In regards to the above providers/personal data controller services with the necessary personal information, the steps in FIGS. 16 and 17 may be executed as discussed above. In the event, a step for a first provider/personal data controller service fails e.g., an authorization is invalid or the performance cannot be currently performed by the personal data controller service, then a second authorized provider/personal data controller service from the list above may take the place of the first provider/personal data controller service in the illustrated steps in FIGS. 16-17 and the steps in these figures may occur for the replacement personal data controller service.

In other embodiments of FIGS. 19 and 18, a first token like that of token 1802 may be associated to a second token. Said second token may like the first token, be used as a reference identifier to information about a user transaction. However, the second token will be used as a "sub-token" to reference information within the information associated to the first token. In this manner, as data can be transferred between services arid devices using this second token in a secure manner. The second token may be transferred to another service without comprising the security of the associated information until it is received at a service with the ability to remap it with the associated information.

Other Embodiments of the Disclosed Tools

In another embodiment, other tools may be used for implementation of the above in place of OAuth technologies. This embodiment does not need to involve the federated identity service. For instance, in one embodiment, once authentication and authorization of the end user task and other conditions/parameters and other related data (such as the relying party identity that may request the end user task) is obtained from the end user directly by a personal data controller service at the request of the relying party, a token is generated by the personal data controller service. The token is passed via a preconfigured relationship to the relying party who is unable to remap it to user personal data the personal data controller service has. However, the relying party may be able to map it to the information it needs/has to cause task execution such as its association to particular task for the particular end user and applicable goods, data or services e.g., will be used to ship a package to the end user. Upon use for the task, the token and the goods/services or even data may be passed with the token to the personal data controller service for execution. This may occur similar to the steps in FIGS. 16 and 17 but instead of the federated identity service executing the relevant illustrated steps, the personal data controller service is executing the steps in place of the federated identity service.

For instance, a user may buy goods and request it to be shipped to her (e.g., request a task to be performed) and place it into the eBay shopping cart and start the purchase process. eBay (a relying party) then provides the end user the option not to disclose her address to eBay but instead to ship it via the disclosed tools using for example FedEx (a personal data controller service) or another shipper. Upon selection of the former, via the preconfigured relationship, eBay directs the user to enter FedEx's site (e.g., opens a window to FedEx's site). The user may logon (authenticate) onto the FedEx site in which she previously entered her personal data on FedEx's site (e.g., associated to her FedEx account). eBay may pass a request comprising the task eBay wishes to have executed by FedEx, the necessary personal information and other desired information (similar to the above embodiments) to FedEx via the preconfigured relationship. Either eBay or FedEx may then ask the end user for authorization to execute the task with optional conditions/parameters that the end user or eBay or FedEx may chose. The end user authorization may be received by FedEx via a preconfigured relationship.

Here, the end user authorizes the task of shipping the package as requested by eBay using her personal data. The authorization is received by FedEx. FedEx may then generate a token based on the above authorization and then close communication with the user after passing the token to the end user. The end user is then returned to the eBay website and the end user device may transmit the token (e.g., via a redirect) associated to this transaction to eBay for shipping authorization and other information eBay may need to associate to the token such as its purpose and what information the token represents. Once eBay passes this token to FedEx, it may be mapped by FedEx to the task and relevant personal data that was authorized above as well as other information such as the particular good/service or data. However, this token does not disclose end user personal information to the relying party because the personal information FedEx had is not shared with eBay because of the nature of the preconfigured relationship. The token may only be remapped to the personal data and other related information by the personal data controller service.

The token then is included on the shipping label eBay prints out and places on the physical package or otherwise associated to the goods/service/data used for the task via the preconfigured relationship. When the shipper (the FedEx personal data controller service) picks up the physical package or other goods/service/data and receives the associated token, the token is associated by FedEx to the transaction via the preconfigured relationship to the task and personal data and other data (such as the package and other task related data) used to complete the authorized task such as deliver the goods/service/data. The FedEx as the personal data controller service may then execute the associated task.

Thus, using the above, tokens may be passed to the relying parties after end user authentication and authorization with a personal data controller service and later passed back to the personal data controller service for task execution.

As discussed in this document, the discussed subject matter solves several technical problems, Specifically solved is the current need by consumer users of email, e-commerce sites and other services provided by brand owners who lack tools to efficiently and conveniently manage information their account information across multiple brand owners. What is disclosed are enhanced and flexible login and profile management tools as well as brand owner communication tools that provide more flexibility in regards to information sharing that benefit both users and brand owners and ease of integration of user information into brand owner databases.

The technical effect of this disclosure are the advantages of the preventative tools that minimize the number of devices and servers that store or maintain direct access to consumer personal data as well tools to ensure that merchants and others have all of the capabilities possible from storing or having, direct access to personal data while continuing to use consumer data in an authorized manner at all times.

Figure 13:
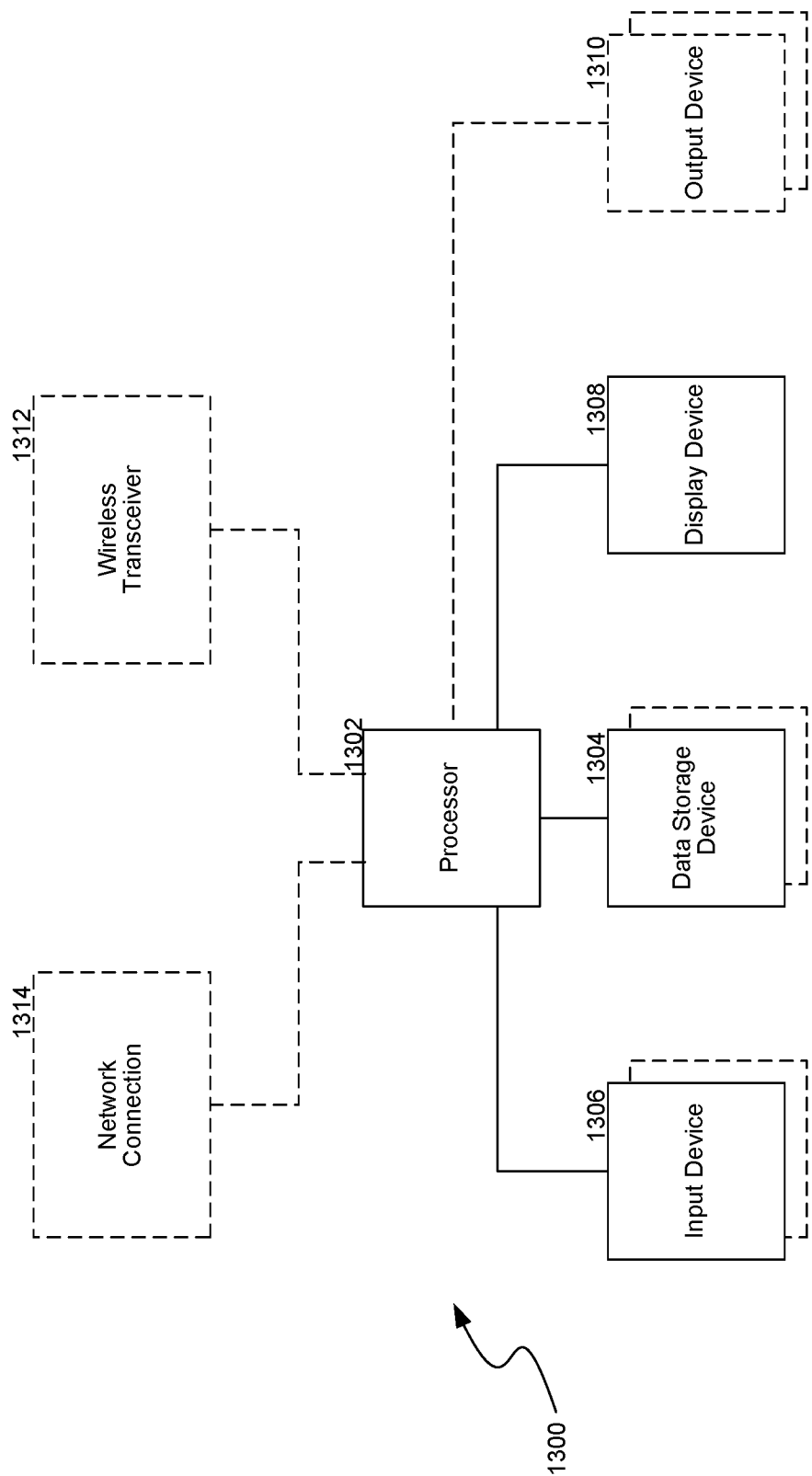
FIG. 13 illustrates a block diagram of a user's computing device in accordance with an embodiment of the disclosed technology.
Figure 14:
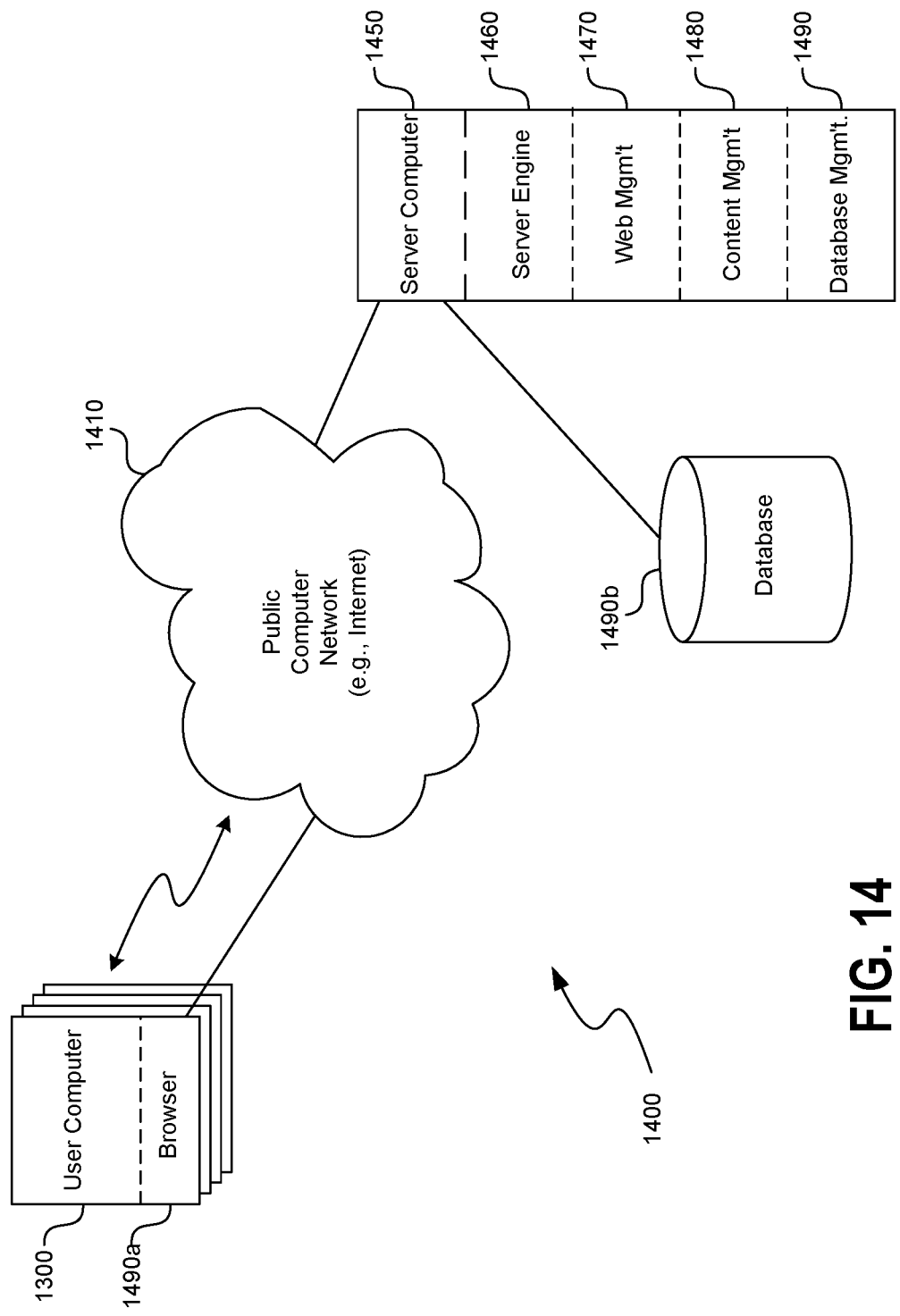
FIG. 14 illustrates one embodiment of a networked computing system used in implementing the disclosed technology.

The disclosed tools may be used on any computing device and combinations of computing devices connected to each other as illustrated in FIGS. 13-14. The advertar may be initially created by receiving input from a client device and stored in memory, altered and processed on a local or remote computing device or a plurality of devices in including the client device. Ads and advertar related information can be input and output to these devices from third party computing devices connected over a network.

APPENDIX A

Persona Primer

As will be discussed in further detail below, the disclosed technology allows users to create personas (also referred to as "advertars" or "advatars") to serve as a privacy screen or a barrier between a user and advertisers. In addition, the disclosed technology can serve as a tool to segment a user's interests/communications. A persona may be represented as an icon or other symbol that can be selected by a user and has a number of characteristics (e.g. demographic characteristics) associated with it. The demographic characteristics may represent either actual or desired demographic characteristics of the user. The demographic characteristics associated with the personas can be used by advertisers to determine a target audience for one or more ads, in one embodiment, ads are delivered to a persona but the advertiser does know the identity of the user associated with the persona. Users may have more than one persona that can receive ads. More than one persona can be active at any time or one or more of the user's personas may be programmed to become active based on the time of day, location of the user, current activity of the user, and proximity of the user to objects, other users or locations or other factors.

Personas can be created by the user, copied from other users who have defined their personas or adopted from one of a number of predefined personas. In one embodiment, the demographic characteristics attributed to a persona are determined based on responses to the user's indicated opinions such as likes or dislikes of a number of brands. As used herein, characteristics may include the demographic characteristics of a population such as (gender, age, location, marital status etc.) as well as properties, characteristics or traits relating to single individual users such as a user's individual interests.

In one example a user who wishes to receive ads from one or more advertisers may use the disclosed tools. The user may select or create a persona that serves as a privacy barrier or screen between the user and the advertisers. Ads are delivered to a logical address, such as to an e-mail address that can be accessed by the user's computing device to receive the ads. In another embodiment, ads are delivered to a server computer (not shown) that forwards the ads to the user's computing device so that the user can receive the ads. The advertisers may not know the identity or other personal information of the user other than the fact that the user's persona has one or more demographic characteristics that indicate that the user may like to receive ads of the type presented by the particular advertiser.

In one embodiment, a persona is implemented as a computer record that represents an address or device identifier to which an advertisement can be directed as well as a number of characteristics (e.g. demographic characteristics) that may be input directly by the user or inferred from user input. The aspects of a persona that can be seen by an advertiser may not identify the identity of the user such that the advertiser cannot contact the user directly other than by the address or device identifier associated with the persona. In one embodiment, a persona has a graphic icon that represents the persona and a number of demographic tags or categories representing the likelihood that the user falls in that demographic category or wishes to receive ads that are directed to people in that demographic category.

In one embodiment, separate cookies and caches are used for each persona when using a web browser or other computing device. This segmentation of persona information prevents information cross over between personas. In addition, this segmentation gives context to the information in the cookies and caches given that all data is related to the persona's interests. This makes optional analysis of such cookies and caches more reliable since the user's activities only pertain to the selected persona. Optionally, the cookies and caches can be encrypted to protect privacy.

Email Accounts and Personas Embodiments

In one embodiment, under a single user account, each persona may be associated with a separate email address. This permits the user to have an email address focused specifically on a single persona. Each persona my have the ability to decline/filter communications according to keyword, sender, dates or other criteria to prevent the persona from being overwhelmed with unsolicited communications.

As illustrated in FIGS. 11-12, a persona may be associated with an email program and an address to help organize information. New email addresses may be created by appending information to existing email addresses. For instance, if an email is brian@roundtree.org, a new email address for a persona may be brian@roundtree.org.0mail.com or other methods can be used to create new email addresses.

The persona 1102 may access an email program as shown in FIG. 11. The email program may group persona mails by domain 1104 and may associate an icon and company name upon domain recognition. An active persona icon 1102 may also be displayed.

An arbitrary level of importance assignment may be featured in which high importance messages such as password assignments are given certain levels that are marked next to the domain "level 1" indication and lesser important mails are given lesser importance levels.

FIG. 12 illustrates functionality of the email program for a specific persona. Here, emails are listed by domain, assigned importance levels and may be read. At 1202, advertising can be directed in the email program using technology discussed in this document. Optionally, the advertising may be based on the active persona and/or related to the subject of the message being read. In addition, once the email is read, it is marked as viewed.

Description of Computer Hardware

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of data processing apparatus.

A non-transitory, computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations perfumed by a data processing device using data stored on one or more computer-readable storage devices or received from other sources. A representative data processing device is shown in FIG. 13.

The data processing device includes "processor electronics" that encompasses all kinds of apparatus, devices, and machines for processing data, including by way of example a programmable microprocessor 1302, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices 1304 for storing data, e.g., flash memory, magnetic disks, magneto-optical disks, or optical disks. However, a computer need not have such devices. Moreover, a computing device can be embedded in another device, e.g., a mobile telephone ("smart phone"), a personal digital assistant (PDA), a mobile audio or video player, a handheld or fixed game console (e.g. Xbox 360), a Global Positioning System (GPS) receiver, or a portable storage device (e.g., a universal serial bus (USB) flash drive), to name just a few. Devices suitable for storing computer program instructions and data include all forms of volatile or non-volatile memory, media and memory devices, including by way of example semiconductor memory devices e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device 1308, e.g., an LCD (liquid crystal display), LED (light emitting diode), or OLED (organic light emitting diode) monitor, for displaying information to the user and an input device 1306 such as a keyboard and a pointing device, a mouse or a trackball, track pad etc., by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser. The data processing apparatus 1300 may also include a wireless transceiver 1312 such a cellular radio, Wi-Fi or WiMax transceiver, Bluetooth transceiver and a network connection 1314 etc. The data processing device may also include an output device such as a printer 1310. In addition, the device may include location sensing devices (GPS etc.), as well as clocks and other circuitry (not shown).

As shown in FIG. 14, embodiments of the subject matter described in this specification can be implemented in a computing system 1400 that includes a back-end component, e.g., as a data server 1450, or that includes a middleware component, e.g., an application server, or that includes a front-end component, e.g., a client computer 1300 having a graphical user interface or a Web browser 1490*a* through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a wired or wireless local area network ("LAN") and a wide area network ("WAN"), an inter-network 1410 (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server 1450 transmits data (e.g., are HTML page) to a client device 1300 (e.g., for purposes of displaying data to and receiving user input from a user interacting with the client device). Data generated at the client device (e.g., a result of the user interaction) can be received from the client device at the server. In the embodiment shown in FIG. 13, the server computer 1450 operates server engine software 1460 and web management software 1470 to receive data from and send data to remote clients. In addition, the server computer operates a database 1490*b* to store persona information for users who wish to receive ads as described above. Content management software 1480 and database management software 1490 allow the server computer to store and retrieve persona information from the database and to search the database for personas that meet advertiser's criteria for a target audience.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

The invention claimed is:

1. A personal data controller computer system, configured to execute a task using end user personal data upon a request from a relying party computing device that has no access to said end user personal data, the personal data controller computer system comprising:
   memory for storing instructions; and
   processor electronics configured to execute the instructions in order to:
      request validation of a task authorization and a task performance ability for the task associated with an access token, wherein the access token was created in response to an end user's authorization to execute the task using end user personal data upon task execution being requested by the relying party computing device;
      in response to receiving confirmation that the task authorization and performance ability for the task associated with the access token are valid, transmit a personal data token response, said personal data token response authorizing the execution of the task associated to the access token in response to the relying party computing device requesting task execution;
      in response to receiving a personal data task request and an associated personal data token based at least on a reply to the personal data token response transmitted by the relying party computing device, determine if the task authorization associated to the end user personal data token response is still valid and if the task associated to the end user personal data token response is still able to be performed,
      wherein transmission of the personal data task request and the associated personal data token was in response to at least an end user or the relying party computing device selecting to transmit the personal data task request to the personal data controller computer system, wherein said selection was from at least the personal data controller computer system and at least another different personal data controller computer system in which each personal data controller computer system requested validation of the task authorization and the task performance ability for the task associated with the access token, wherein selection of the personal data controller computer system was based on at least on a portion of the personal data token response transmitted by each of the personal data controller computer systems; and in response to confirmation that the authorization associated to the end user personal data token response is still valid and that the task associated to the end user personal data token response is still able to be performed, execute, the task authorized by the end user personal data token response using the end user personal data.

2. The personal data controller computer system of claim 1, wherein the end user personal data comprises one or more email data, an end user physical address, an end user electronic address or an end user phone number.

3. The personal data controller computer system of claim 1, wherein the personal data token response is associated to instructions to transmit the personal data task request back to the personal data controller computer system in order for the personal data controller computer system to execute the task.

4. The personal data controller computer system of claim 1, wherein the execution of the task is contingent upon a condition associated to the task being validated as true at the time of execution.

5. The personal data controller computer system of claim 1, wherein the execution of the task is only authorized if execution is requested in a time period authorized by the end user.

6. The personal data controller computer system of claim 1, wherein the personal data token response comprises a personal data token, wherein the personal data token is created in response to the validation that the end user's authorization to execute the task using end user personal data upon task execution being requested by the relying party computing device is still valid.

7. A personal data controller computer system, configured to execute a task using end user personal data upon request of a relying party computing device that has no access to end user personal data, the personal data controller computer system comprising:
memory for storing instructions; and
processor electronics configured to execute the instructions in order to:
request validation of a task authorization and a task performance ability for the task associated with an access token, wherein the access token was created in response to an end user's authorization to execute the task using end user personal data upon task execution being requested by the relying party computing device;
in response to receiving confirmation that the task performance ability for the task associated with the access token is valid, transmit a personal data token response, said personal data token response authorizing the execution of the task associated to the access token in response to the relying party computing device requesting task execution;
in response to receiving a personal data task request and an associated personal data token based at least in part on a reply to the end user personal data token response transmitted by the relying party computing device, determine if a task authorization associated to the end user personal data token response is still valid, wherein transmission of the personal data task request and the associated personal data token was in response to at least an end user or the relying party computing device selecting to transmit the personal data task request to the personal data controller computer system, wherein said selection was from at least the personal data controller computer system and at least another different personal data controller computer system in which each personal data controller computer system
requested validation of the task authorization and the task performance ability for the task associated with the access token, wherein selection of the personal data controller computer system was based on at least a portion of the personal data token response transmitted by each of the personal data controller computer systems; and
in response to confirmation that the authorization associated to the end user personal data token response is still valid and that the task associated to the end user personal data token response is still able to be performed, execute the task authorized by the end user personal data token response using the end user personal data.

8. The personal data controller computer system of claim 7, wherein the end user personal data comprises one or more of email data, an end user physical address, an end user electronic address or an end user phone number.

9. The personal data controller computer system of claim 7, wherein the personal data token response is associated with instructions to transmit the personal data task request back to the personal data controller computer system in order for the personal data controller computer system to execute the task.

10. The personal data controller computer system of claim 7, wherein the execution of the task is contingent upon a condition associated to the task being validated as true at the time of execution.

11. The personal data controller computer system of claim 7, wherein the execution of the task is only authorized if execution is requested in a time period authorized by the end user.

12. The personal data controller computer system of claim 7, wherein the personal data token response comprises a personal data token, wherein the personal data token was created in response to the validation that the end user's authorization to execute the task using end user personal data upon task execution being requested by the relying party computing device is still valid.

13. A non-transitory computer readable medium having instructions stored thereon that are executable by processor electronics to execute a task using end user personal data upon request from a relying party computing device that has no access to the end user personal data where the instructions are executed in order to:
request validation of a task authorization and a task performance ability for the task associated with an access token, wherein the access token was created in response to an end user's authorization to execute the task using end user personal data upon task execution being requested by the relying party computing device;
in response to receiving confirmation that the task performance ability for the task associated with the access token is valid, transmit a personal data token response, said personal data token response authorizing the execution of the task associated to the access token in response to the relying party computing device requesting task execution;

in response to receiving a personal data task request and an associated personal data token based at least in part on a reply to the end user personal data token response transmitted by the relying party computing device, determine if a task authorization associated to the end user personal data token response is still valid, wherein transmission of the personal data task request and the associated personal data token was in response to at least an end user or the relying party computing device selecting to transmit the personal data task request to the personal data controller computer system, wherein said selection was from at least the personal data controller computer system and at least another different personal data controller computer system in which each personal data controller computer system requested validation of the task authorization and the task performance ability for the task associated with the access token, wherein selection of the personal data controller computer system was based on at least a portion of the personal data token response transmitted by each of the personal data controller computer systems; and in response to confirmation that the authorization associated to the end user personal data token response is still valid and that the task associated to the end user personal data token response is still able to be performed, execute the task authorized by the end user personal data token response using the end user personal data.

14. The non-transitory computer readable medium of claim 13, wherein the end user personal data comprises one or more of email data, an end user physical address, an end user electronic address or an end user phone number.

15. The non-transitory computer readable medium of claim 13, wherein the execution of the task is contingent upon a condition associated to the task being validated as true at the time of execution.

16. The non-transitory computer readable medium of claim 13, wherein the execution of the task is only authorized if execution is requested in a time period authorized by the end user.

17. The non-transitory computer readable medium of claim 13, wherein the personal data token response comprises a personal data token, wherein the personal data token was created in response to the validation that the end user's authorization to execute the task using end user personal data upon task execution being requested by the relying party computing device is still valid.

* * * * *